(12) United States Patent
Zhang et al.

(10) Patent No.: US 12,267,813 B2
(45) Date of Patent: Apr. 1, 2025

(54) RESOURCE CONFIGURATION METHOD AND COMMUNICATION APPARATUS

(71) Applicant: HUAWEI TECHNOLOGIES CO., LTD., Guangdong (CN)

(72) Inventors: Fang Zhang, Shanghai (CN); Quanzhong Gao, Shanghai (CN); Liwen Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 318 days.

(21) Appl. No.: 17/535,333

(22) Filed: Nov. 24, 2021

(65) Prior Publication Data

US 2022/0086816 A1 Mar. 17, 2022

Related U.S. Application Data

(63) Continuation of application No. PCT/CN2020/093032, filed on May 28, 2020.

(30) Foreign Application Priority Data

May 28, 2019 (CN) .......................... 201910453302.7

(51) Int. Cl.
*H04W 72/044* (2023.01)
*H04L 5/00* (2006.01)
(Continued)

(52) U.S. Cl.
CPC ........... *H04W 72/044* (2013.01); *H04L 5/001* (2013.01); *H04L 5/0094* (2013.01);
(Continued)

(58) Field of Classification Search
CPC ............... H04W 72/044; H04W 72/23; H04W 72/0446; H04W 72/0453; H04W 76/15;
(Continued)

(56) References Cited

U.S. PATENT DOCUMENTS

| 10,021,693 B1 * | 7/2018 | Pawar | ............... H04W 72/0453 |
| 2014/0286206 A1 * | 9/2014 | Song | ..................... H04J 3/1694 370/336 |

(Continued)

FOREIGN PATENT DOCUMENTS

| CN | 109120372 A | 1/2019 |
| CN | 109495971 A | 3/2019 |

(Continued)

OTHER PUBLICATIONS

Office Action issued in Chinese Application No. 201910453302.7 on Jan. 28, 2021, 17 pages (with English translation).

(Continued)

*Primary Examiner* — Brian J. Gillis
*Assistant Examiner* — Chhian (Amy) Ling
(74) *Attorney, Agent, or Firm* — Fish & Richardson P.C.

(57) ABSTRACT

In one example method, an access network device sends a plurality of pieces of time division multiplexing mode information to a terminal, where each of the plurality of pieces of time division multiplexing mode information indicates one time division multiplexing mode, and in the time division multiplexing mode, time division multiplexing is performed on a first uplink time domain resource and a second uplink time domain resource, the first uplink time domain resource is an uplink time domain resource of a first carrier, and the second uplink time domain resource is an uplink time domain resource of a second carrier. The access network device sends first information to the terminal, where the first information activates one of the plurality of time division multiplexing modes indicated by the plurality of pieces of time division multiplexing mode information.

20 Claims, 9 Drawing Sheets

(51) Int. Cl.
  *H04L 5/14* (2006.01)
  *H04W 72/0446* (2023.01)
  *H04W 72/23* (2023.01)
(52) U.S. Cl.
  CPC .............. *H04L 5/0098* (2013.01); *H04L 5/14* (2013.01); *H04L 5/1469* (2013.01); *H04W 72/23* (2023.01); *H04W 72/0446* (2013.01)
(58) Field of Classification Search
  CPC ..... H04L 5/001; H04L 5/0094; H04L 5/0098; H04L 5/14; H04L 5/1469; H04L 5/0053
  See application file for complete search history.

(56) References Cited

U.S. PATENT DOCUMENTS

| | | | |
|---|---|---|---|
| 2016/0192355 A1* | 6/2016 | Yu | H04L 5/0053 370/280 |
| 2017/0013577 A1* | 1/2017 | Berggren | H04W 72/1215 |
| 2018/0191483 A1* | 7/2018 | Yamazaki | H04W 74/0833 |
| 2019/0141742 A1 | 5/2019 | Zhou et al. | |
| 2019/0357264 A1* | 11/2019 | Yi | H04L 1/1819 |
| 2020/0059273 A1* | 2/2020 | Guo | H04B 7/0404 |
| 2020/0154496 A1 | 5/2020 | Yi | |
| 2020/0178213 A1* | 6/2020 | Xu | H04W 8/005 |
| 2020/0196326 A1* | 6/2020 | Li | H04L 1/1854 |
| 2020/0260459 A1* | 8/2020 | Jiang | H04W 72/0446 |
| 2021/0176747 A1* | 6/2021 | Yang | H04W 72/0446 |
| 2021/0204262 A1* | 7/2021 | Xu | H04L 5/0098 |
| 2022/0123915 A1* | 4/2022 | Yoshioka | H04L 5/14 |
| 2022/0159674 A1* | 5/2022 | Deng | H04W 72/566 |
| 2022/0167372 A1* | 5/2022 | Zhang | H04L 5/0032 |

FOREIGN PATENT DOCUMENTS

| | | |
|---|---|---|
| CN | 110278610 A | 9/2019 |
| EP | 3684092 A4 | 11/2020 |
| JP | 2018085774 A | 5/2018 |
| JP | 2019004469 A | 1/2019 |
| WO | 2018128426 A1 | 7/2018 |
| WO | 2018226065 A1 | 12/2018 |
| WO | 2019041350 A1 | 3/2019 |
| WO | 2019092196 A1 | 5/2019 |
| WO | 2019099709 A1 | 5/2019 |

OTHER PUBLICATIONS

PCT International Search Report and Written Opinion issued in International Application No. PCT/CN2020/093032 on Aug. 19, 2020, 17 pages (with English translation).

Vivo, "Remaining issues on UE self-interference handling," 3GPP TSG RAN WG1 Meeting #90bis, R1-1717507, Prague, Czech Republic, Oct. 9-13, 2017, 5 pages.

Office Action in Japanese Appln. No. 2021-570289, dated Apr. 4, 2023, 5 pages (with English translation).

Huawei et al., "Further Consideration on FDD+TDD HPUE," 3GPP TSG-RAN WG4 Meeting #90bis, R4-1904522, Xi'an, China, Apr. 8-12, 2019, 6 pages.

Office Action in Japanese Appln. No. 2021-570289, dated Dec. 6, 2022, 8 pages (with English translation).

Extended European Search Report issued in European Application No. 20812669.8 on Jun. 8, 2022, 10 pages.

EP Communication Pursuant to Article 94(3) EPC in European Appln No. 20812669.8, dated Feb. 27, 2024, 11 pages.

\* cited by examiner

RESOURCE CONFIGURATION METHOD AND COMMUNICATION APPARATUS

CROSS-REFERENCE TO RELATED APPLICATIONS

This application is a continuation of International Application No. PCT/CN2020/093032, filed on May 28, 2020, which claims priority to Chinese Patent Application No. 201910453302.7, filed on May 28, 2019. The disclosures of the aforementioned applications are hereby incorporated by reference in their entireties.

TECHNICAL FIELD

Embodiments of this application relate to the communication field, and in particular, to a resource configuration method and a communication apparatus.

BACKGROUND

To satisfy a bandwidth requirement of a 5th generation ($5^{th}$ generation, 5G) communication system, a carrier aggregation (carrier aggregation, CA) technology is also introduced in 5G new radio (new radio, NR), so that a plurality of contiguous or non-contiguous carriers (carriers) can be aggregated into a larger bandwidth, to satisfy a rate requirement of the 5G communication system.

However, in a CA scenario, a terminal needs to configure a radio frequency capability such as a quantity of transmit antennas and a transmit power for each aggregated carrier based on a prerequisite of simultaneous sending on carriers. Therefore, the radio frequency capability on each carrier is much lower than a radio frequency capability in a single-carrier transmission mode.

In a possible solution, the terminal may perform transmission on a plurality of uplink carriers in a TDM mode, so that the rate requirement of the 5G communication system can be satisfied, and performance of a single carrier does not deteriorate. Therefore, a solution is urgently needed to configure resources for a plurality of uplink carriers for transmission in a TDM mode.

SUMMARY

Embodiments of this application provide a resource configuration method and a communication apparatus, to configure a plurality of TDM modes, and in each TDM mode, time domain resources of a plurality of uplink carriers do not overlap, and then one of the TDM modes can be flexibly indicated, so that a time domain resource can be flexibly allocated to each carrier on demand, and communication performance can be improved.

To achieve the foregoing objective, the following technical solutions are used in the embodiments of this application.

According to a first aspect, a time division multiplexing mode configuration method is disclosed. The method may be performed by an access network device or a chip in the access network device. The method includes: The access network device sends a plurality of pieces of time division multiplexing mode information to a terminal, where each of the plurality of pieces of time division multiplexing mode information is used to indicate one time division multiplexing mode, and in the time division multiplexing mode, time division multiplexing is performed on a first uplink time domain resource and a second uplink time domain resource, the first uplink time domain resource is an uplink time domain resource of a first carrier, and the second uplink time domain resource is an uplink time domain resource of a second carrier; and the access network device sends first information to the terminal, where the first information is used to activate one of the plurality of time division multiplexing modes indicated by the plurality of pieces of time division multiplexing mode information. In a possible implementation, the first information is used to indicate one of the plurality of time division multiplexing modes.

In the method provided in this embodiment of this application, the access network device may configure the plurality of TDM (time division multiplexing) modes for the terminal, and activate one of the plurality of TDM modes. The terminal may perform transmission on a plurality of uplink carriers, for example, the first carrier and the second carrier, in the TDM mode based on the uplink time domain resources indicated by the TDM mode information. The terminal may perform transmission on the plurality of uplink carriers in the TDM mode, so that a rate requirement of a 5G communication system can be satisfied, and performance of a single carrier does not deteriorate. Therefore, an uplink radio resource can be effectively used, and uplink communication performance can be improved.

With reference to the first aspect, in a first possible implementation of the first aspect, the first uplink time domain resource is an uplink time domain resource initially configured on the first carrier, and the second uplink time domain resource is an uplink time domain resource initially configured on the second carrier.

In the method provided in this application, the access network device may send, to the terminal, configuration information of the plurality of uplink carriers for sending in the TDM mode, to indicate the terminal to perform sending on the plurality of uplink carriers in the time division multiplexing mode.

With reference to the first aspect or the first possible implementation of the first aspect, the plurality of pieces of time division multiplexing mode information include first tune division multiplexing mode information; and the first uplink time domain resource is an uplink time domain resource initially configured on the first carrier, the first time division multiplexing mode information indicates that a part of an uplink time domain resource initially configured on the second carrier is the second uplink time domain resource, and the first uplink time domain resource overlaps the uplink time domain resource initially configured on the second carrier; or the first time division multiplexing mode information indicates that a part of an uplink time domain resource initially configured on the first carrier is the first uplink time domain resource, and indicates that a part of an uplink time domain resource initially configured on the second carrier is the second uplink time domain resource, and the uplink time domain resource initially configured on the first carrier overlaps the uplink time domain resource initially configured on the second carrier.

In the method provided in this application, the access network device may indicate, to the terminal, time domain resources of the plurality of uplink carriers for sending in the TDM mode, to indicate the terminal to perform sending on the plurality of uplink carriers in the time division multiplexing mode.

With reference to the first aspect or the first or the second possible implementation of the first aspect, in a third possible implementation of the first aspect, the plurality of pieces of time division multiplexing mode information are carried by using an RRC message, and the first information is carried by using DCI.

In the method provided in this embodiment of this application, the access network device may reconfigure a plurality of possible uplink time domain resources for the first carrier and the second carrier by using the RRC message, to ensure that the uplink time domain resources of the first carrier and the second carrier do not overlap in time domain, and the access network device may further activate a resource configuration by using the DCI, to enable the terminal to perform sending on the first carrier and the second carrier in the time division multiplexing mode.

With reference to the first aspect or the first to the third possible implementations of the first aspect, in a fourth possible implementation of the first aspect, the first information includes an index of one time division multiplexing mode.

In this embodiment of this application, the plurality of time division multiplexing modes configured by the access network device have different indexes, the access network device indicates one index by using the first information, and the terminal may determine one time division multiplexing mode based on the index, and perform sending on the first carrier and the second carrier in time division on uplink time domain resources corresponding to the time division multiplexing mode.

With reference to the first aspect or the first to the fourth possible implementations of the first aspect, in a fifth possible implementation of the first aspect, the first carrier and the second carrier support carrier aggregation CA; or the first carrier is a normal uplink NUL carrier, and the second carrier is a supplementary uplink SUL carrier; or the first carrier is a primary cell uplink carrier, and the second carrier is a secondary cell uplink carrier.

The method provided in this embodiment of this application supports a CA scenario, an SUL scenario, and a dual connectivity (dual connectivity, DC) scenario.

With reference to the first aspect or the first to the fifth possible implementations of the first aspect, in a sixth possible implementation of the first aspect, the first carrier is an FDD duplex mode, and the second carrier is a TDD duplex mode; the first carrier is an FDD duplex mode, and the second carrier is an FDD duplex mode; the first carrier is a TDD duplex mode, and the second carrier is an FDD duplex mode; or the first carrier is a TDD duplex mode, and the second carrier is a TDD duplex mode.

According to a second aspect, a time division multiplexing mode configuration method is disclosed. The method may be performed by a terminal or a chip in the terminal. The method includes: The terminal receives a plurality of pieces of time division multiplexing mode information from an access network device, where each of the plurality of pieces of time division multiplexing mode information is used to indicate one time division multiplexing mode, and in the time division multiplexing mode, time division multiplexing is performed on a first uplink time domain resource and a second uplink time domain resource, the first uplink time domain resource is an uplink time domain resource of a first carrier, and the second uplink time domain resource is an uplink time domain resource of a second carrier; and the terminal receives first information from the access network device, where the first information is used to activate one of the plurality of time division multiplexing modes indicated by the plurality of pieces of time division multiplexing mode information.

With reference to the second aspect, in a first possible implementation of the second aspect, the first uplink time domain resource is an uplink time domain resource initially configured on the first carrier, and the second uplink time domain resource is an uplink time domain resource initially configured on the second carrier.

In the method provided in this application, the access network device may send, to the terminal, configuration information of the plurality of uplink carriers for sending in the TDM mode, to indicate the terminal to perform sending on the plurality of uplink carriers in the time division multiplexing mode.

With reference to the second aspect or the first possible implementation of the second aspect, in a second possible implementation of the second aspect, the plurality of pieces of time division multiplexing mode information include first time division multiplexing mode information; and the first uplink time domain resource is an uplink time domain resource initially configured on the first carrier, the first time division multiplexing mode information indicates that a part of an uplink time domain resource initially configured on the second carrier is the second uplink time domain resource, and the first uplink time domain resource overlaps the uplink time domain resource initially configured on the second carrier; or the first time division multiplexing mode information indicates that a part of an uplink time domain resource initially configured on the first carrier is the first uplink time domain resource, and indicates that a part of an uplink time domain resource initially configured on the second carrier is the second uplink time domain resource, and the uplink time domain resource initially configured on the first carrier overlaps the uplink time domain resource initially configured on the second carrier.

In the method provided in this application, the access network device may indicate, to the terminal, time domain resources of the plurality of uplink carriers for sending in the TDM mode, to indicate the terminal to perform sending on the plurality of uplink carriers in the time division multiplexing mode.

With reference to the second aspect or the first or the second possible implementation of the second aspect, in a third possible implementation of the second aspect, the plurality of pieces of time division multiplexing mode information are carried by using an RRC message, and the first information is carried by using DCI.

In the method provided in this embodiment of this application, the access network device may reconfigure a plurality of possible uplink time domain resources for the first carrier and the second carrier by using the RRC message, to ensure that the uplink time domain resources of the first carrier and the second carrier do not overlap in time domain, and the access network device may further activate a resource configuration by using the DCI, to enable the terminal to perform sending on the first carrier and the second carrier in the time division multiplexing mode.

With reference to the second aspect or the first to the third possible implementations of the second aspect, in a fourth possible implementation of the second aspect, the first information includes an index of one time division multiplexing mode.

In this embodiment of this application, the plurality of time division multiplexing modes configured by the access network device have different indexes, the access network device indicates one index by using the first information, and the terminal may determine one time division multiplexing mode based on the index, and perform sending on the first carrier and the second carrier in time division on uplink time domain resources corresponding to the time division multiplexing mode.

With reference to the second aspect or the first to the fourth possible implementations of the second aspect, in a fifth possible implementation of the second aspect, the first carrier and the second carrier support carrier aggregation CA; or the first carrier is a normal uplink NUL carrier, and the second carrier is a supplementary uplink SUL carrier; or the first carrier is a primary cell uplink carrier, and the second carrier is a secondary cell uplink carrier.

The method provided in this embodiment of this application supports a CA scenario, an SUL, scenario, and a dual connectivity (dual connectivity, DC) scenario.

With reference to the second aspect or the first to the fifth possible implementations of the second aspect, in a sixth possible implementation of the second aspect, the first carrier is an FDD duplex mode, and the second carrier is a TDD duplex mode; the first carrier is an FDD duplex mode, and the second carrier is an FDD duplex mode; the first carrier is a TDD duplex mode, and the second carrier is an FDD duplex mode; or the first carrier is a TDD duplex mode, and the second carrier is a TDD duplex mode.

According to a third aspect, a communication apparatus is disclosed. The communication apparatus may be an access network device or a chip in the access network device. The apparatus includes: a communication unit, configured to send a plurality of pieces of time division multiplexing mode information to a terminal, where each of the plurality of pieces of time division multiplexing mode information is used to indicate one time division multiplexing mode, and in the time division multiplexing mode, time division multiplexing is performed on a first uplink time domain resource and a second uplink time domain resource, the first uplink time domain resource is an uplink time domain resource of a first carrier, and the second uplink time domain resource is an uplink time domain resource of a second carrier, where the communication unit is further configured to send first information to the terminal, where the first information is used to activate one of the plurality of time division multiplexing modes indicated by the plurality of pieces of time division multiplexing mode information.

In this embodiment of this application, the access network device may configure the plurality of TDM (time division multiplexing) modes for the terminal, and activate one of the plurality of TDM modes. The terminal may perform transmission on a plurality of uplink carriers, for example, the first carrier and the second carrier, in the TDM mode based on the uplink time domain resources indicated by the TDM mode information. The terminal may perform transmission on the plurality of uplink carriers in the TDM mode, so that a rate requirement of a 5G communication system can be satisfied, and performance of a single carrier does not deteriorate. Therefore, an uplink radio resource can be effectively used, and uplink communication performance can be improved.

With reference to the third aspect, in a first possible implementation of the third aspect, the first uplink time domain resource is an uplink time domain resource initially configured on the first carrier, and the second uplink time domain resource is an uplink time domain resource initially configured on the second carrier.

In this application, the access network device may send, to the terminal, configuration information of the plurality of uplink carriers for sending in the TDM mode, to indicate the terminal to perform sending on the plurality of uplink carriers in the time division multiplexing mode.

With reference to the third aspect or the first possible implementation of the third aspect, in a second possible implementation of the third aspect, the plurality of pieces of time division multiplexing mode information include first time division multiplexing mode information; and the first uplink time domain resource is an uplink time domain resource initially configured on the first carrier, the first time division multiplexing mode information indicates that a part of an uplink time domain resource initially configured on the second carrier is the second uplink time domain resource, and the first uplink time domain resource overlaps the uplink time domain resource initially configured on the second carrier; or the first time division multiplexing mode information indicates that a part of an uplink time domain resource initially configured on the first carrier is the first uplink time domain resource, and indicates that a part of an uplink time domain resource initially configured on the second carrier is the second uplink time domain resource, and the uplink time domain resource initially configured on the first carrier overlaps the uplink time domain resource initially configured on the second carrier.

In the method provided in this application, the access network device may indicate, to the terminal, time domain resources of the plurality of uplink carriers for sending in the TDM mode, to indicate the terminal to perform sending on the plurality of uplink carriers in the time division multiplexing mode.

With reference to the third aspect or the first or the second possible implementation of the third aspect, in a third possible implementation of the third aspect, the plurality of pieces of time division multiplexing mode information are carried by using an RRC message, and the first information is carried by using DCI.

In this embodiment of this application, the access network device may reconfigure a plurality of possible uplink time domain resources for the first carrier and the second carrier by using the RRC message, to ensure that the uplink time domain resources of the first carrier and the second carrier do not overlap in time domain, and the access network device may further activate a resource configuration by using the DCI, to enable the terminal to perform sending on the first carrier and the second carrier in the time division multiplexing mode.

With reference to the third aspect or the first to the third possible implementations of the third aspect, in a fourth possible implementation of the third aspect, the first information includes an index of one time division multiplexing mode.

In this embodiment of this application, the plurality of time division multiplexing modes configured by the access network device have different indexes, the access network device indicates one index by using the first information, and the terminal may determine one time division multiplexing mode based on the index, and perform sending on the first carrier and the second carrier in time division on uplink time domain resources corresponding to the time division multiplexing mode.

With reference to the third aspect or the first to the fourth possible implementations of the third aspect, in a fifth possible implementation of the third aspect, the first carrier and the second carrier support carrier aggregation CA; or the first carrier is a normal uplink NUL carrier, and the second carrier is a supplementary uplink SUL carrier; or the first carrier is a primary cell uplink carrier, and the second carrier is a secondary cell uplink carrier.

The method provided in this embodiment of this application supports a CA scenario, an SUL scenario, and a dual connectivity (dual connectivity, DC) scenario.

With reference to the third aspect or the first to the fifth possible implementations of the third aspect, in a sixth possible implementation of the third aspect, the first carrier is an FDD duplex mode, and the second carrier is a TDD duplex mode; the first carrier is an FDD duplex mode, and the second carrier is an FDD duplex mode; the first carrier is a TDD duplex mode, and the second carrier is an FDD duplex mode; or the first carrier is a TDD duplex mode, and the second carrier is a TDD duplex mode.

According to a fourth aspect, a communication apparatus is disclosed. The communication apparatus may be a terminal or a chip in the terminal. The apparatus includes: a communication unit, configured to receive a plurality of pieces of time division multiplexing mode information from an access network device, where each of the plurality of pieces of time division multiplexing mode information is used to indicate one time division multiplexing mode, and in the time division multiplexing mode, time division multiplexing is performed on a first uplink time domain resource and a second uplink time domain resource, the first uplink time domain resource is an uplink time domain resource of a first carrier, and the second uplink time domain resource is an uplink time domain resource of a second carrier, where the communication unit is further configured to receive first information from the access network device, where the first information is used to activate one of the plurality of time division multiplexing modes indicated by the plurality of pieces of time division multiplexing mode information.

In this embodiment of this application, the access network device may configure the plurality of TDM (time division multiplexing) modes for the terminal, and activate one of the plurality of TDM modes. The terminal may perform transmission on a plurality of uplink carriers, for example, the first carrier and the second carrier, in the TDM mode based on the uplink time domain resources indicated by the TDM mode information. The terminal may perform transmission on the plurality of uplink carriers in the TDM mode, so that a rate requirement of a 5G communication system can be satisfied, and performance of a single carrier does not deteriorate. Therefore, an uplink radio resource can be effectively used, and uplink communication performance can be improved.

With reference to the fourth aspect, in a first possible implementation of the fourth aspect, the first uplink time domain resource is an uplink time domain resource initially configured on the first carrier, and the second uplink time domain resource is an uplink time domain resource initially configured on the second carrier.

In this application, the access network device may send, to the terminal, configuration information of the plurality of uplink carriers for sending in the TDM mode, to indicate the terminal to perform sending on the plurality of uplink carriers in the time division multiplexing mode.

With reference to the fourth aspect or the first possible implementation of the fourth aspect, in a second possible implementation of the fourth aspect, the plurality of pieces of time division multiplexing mode information include first time division multiplexing mode information; and the first uplink time domain resource is an uplink time domain resource initially configured on the first carrier, the first time division multiplexing mode information indicates that a part of an uplink time domain resource initially configured on the second carrier is the second uplink time domain resource, and the first uplink time domain resource overlaps the uplink time domain resource initially configured on the second carrier; or the first time division multiplexing mode information indicates that a part of an uplink time domain resource initially configured on the first carrier is the first uplink time domain resource, and indicates that a part of an uplink time domain resource initially configured on the second carrier is the second uplink time domain resource, and the uplink time domain resource initially configured on the first carrier overlaps the uplink time domain resource initially configured on the second carrier.

In the method provided in this application, the access network device may indicate, to the terminal, time domain resources of the plurality of uplink carriers for sending in the TDM mode, to indicate the terminal to perform sending on the plurality of uplink carriers in the time division multiplexing mode.

With reference to the fourth aspect or the first or the second possible implementation of the fourth aspect, in a third possible implementation of the fourth aspect, the plurality of pieces of time division multiplexing mode information are carried by using an RRC message, and the first information is carried by using DCI.

In this embodiment of this application, the access network device may reconfigure a plurality of possible uplink time domain resources for the first carrier and the second carrier by using the PAC message, to ensure that the uplink time domain resources of the first carrier and the second carrier do not overlap in time domain, and the access network device may further activate a resource configuration by using the DCI, to enable the terminal to perform sending on the first carrier and the second carrier in the time division multiplexing mode.

With reference to the fourth aspect or the first to the third possible implementations of the fourth aspect, in a fourth possible implementation of the fourth aspect, the first information includes an index of one time division multiplexing mode.

In this embodiment of this application, the plurality of time division multiplexing modes configured by the access network device have different indexes, the access network device indicates one index by using the first information, and the terminal may determine one time division multiplexing mode based on the index, and perform sending on the first carrier and the second carrier in time division on uplink time domain resources corresponding to the time division multiplexing mode.

With reference to the fourth aspect or the first to the fourth possible implementations of the fourth aspect, in a fifth possible implementation of the fourth aspect, the first carrier and the second carrier support carrier aggregation CA; or the first carrier is a normal uplink NUL carrier, and the second carrier is a supplementary uplink SUL carrier; or the first carrier is a primary cell uplink carrier, and the second carrier is a secondary cell uplink carrier.

The method provided in this embodiment of this application supports a CA scenario, an SUL scenario, and a dual connectivity (dual connectivity, DC) scenario.

With reference to the fourth aspect or the first to the fifth possible implementations of the fourth aspect, in a sixth possible implementation of the fourth aspect, the first carrier is an FDD duplex mode, and the second carrier is a TDD duplex mode; the first carrier is an FDD duplex mode, and the second carrier is an FDD duplex mode; the first carrier is a TDD duplex mode, and the second carrier is an FDD duplex mode; or the first carrier is a TDD duplex mode, and the second carrier is a TDD duplex mode.

According to a fifth aspect, a communication apparatus is disclosed. The communication apparatus includes a processor, where the processor is coupled to a memory. The memory is configured to store a computer program. The processor is configured to execute the computer program stored in the memory, to enable the apparatus to perform the method according to any one of the first aspect or the possible implementations of the first aspect, or any one of the second aspect or the possible implementations of the second aspect.

According to a sixth aspect, a readable storage medium is disclosed. The readable storage medium includes a program or instructions. When the program is run or the instructions are run by a processor, the method according to any one of the first aspect or the possible implementations of the first aspect, or any one of the second aspect or the possible implementations of the second aspect is implemented.

According to a seventh aspect, a computer-readable storage medium is disclosed. The computer-readable storage medium includes instructions. When the instructions are run on a computer, the computer is enabled to perform the method according to any one of the first aspect or the possible implementations of the first aspect, or any one of the second aspect or the possible implementations of the second aspect.

According to an eighth aspect, a computer program product is disclosed. The computer program product includes instructions. When the instructions are run on a computer, the computer is enabled to perform the method according to any one of the first aspect or the possible implementations of the first aspect, or any one of the second aspect or the possible implementations of the second aspect.

According to a ninth aspect, a wireless communication apparatus is disclosed. The wireless communication apparatus stores instructions. When the wireless communication apparatus runs on the apparatuses according to the third aspect and the fourth aspect, the apparatus is enabled to perform the method for implementing any one of the first aspect or the possible implementations of the first aspect, or the method for implementing any one of the second aspect or the possible implementations of the second aspect. The wireless communication apparatus is a chip.

According to a tenth aspect, an embodiment of this application provides a chip. The chip includes a processor and an interface circuit, the interface circuit is coupled to the processor, and the processor is configured to run a computer program or instructions, to implement the method according to any one of the first aspect or the possible implementations of the first aspect, or any one of the second aspect or the possible implementations of the second aspect. The interface circuit is configured to communicate with a module other than the chip.

DESCRIPTION OF EMBODIMENTS

The following describes technical solutions of this application with reference to the accompanying drawings.

Figure 1:
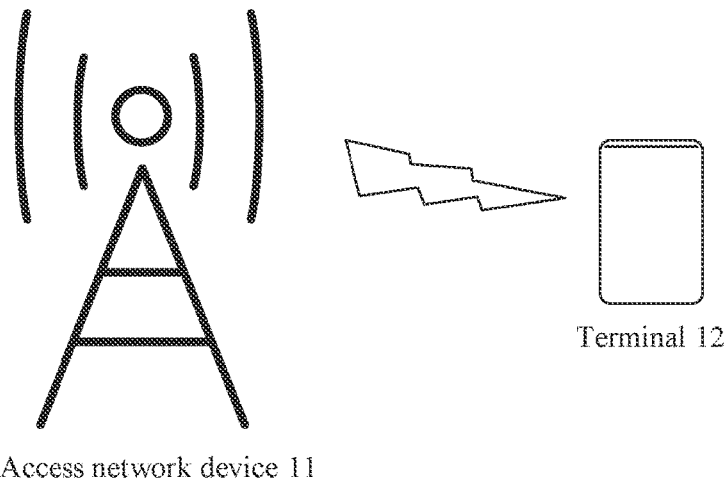
FIG. 1 is a block diagram of a structure of a communication system according to an embodiment of this application.

An embodiment of the present invention provides a communication system. The communication system includes an access network device and at least one terminal, and the at least one terminal may perform wireless communication with the access network device. FIG. 1 is a schematic diagram of a communication system according to an embodiment of this application. As shown in FIG. 1, the access network device includes an access network device 11, the at least one terminal includes a terminal 12, and the access network device 11 may perform wireless communication with the terminal 12. It should be noted that the access network device and the terminal included in the communication system shown in FIG. 1 are merely examples. In this embodiment of the present invention, types and a quantity of network elements included in the communication system and a connection relationship between the network elements are not limited thereto.

A communication system in the embodiments of this application may be a communication system supporting a fourth generation (fourth generation, 4G) access technology, for example, a long term evolution (long term evolution, LTE) access technology. Alternatively, the communication system may be a communication system supporting a fifth generation (fifth generation, 5G) access technology, for example, a new radio (new radio, NR) access technology. Alternatively, the communication system may be a communication system supporting a third generation (third generation, 3G) access technology, for example, a universal mobile telecommunications system (universal mobile telecommunications system, UMTS) access technology. Alternatively, the communication system may be a communication system supporting a plurality of wireless technologies, for example, a communication system supporting an LTE technology and an NR technology. In addition, the communication system may be further used in a future-oriented communication technology.

An access network device in the embodiments of this application may be a device that is on an access network side and that is configured to support a terminal in accessing a communication system, for example, may be a base transceiver station (base transceiver station, BTS) or a base station controller (base station controller, BSC) in a communication system supporting a 2G access technology, a NodeB (NodeB) or a radio network controller (radio network controller, RNC) in a communication system supporting a 3G access technology, an evolved NodeB (evolved NodeB, eNB) in a communication system supporting a 4G access technology, or a next generation NodeB (next generation NodeB, gN), a transmission reception point (transmission reception point, TRP), a relay node (relay node), or an access point (access point, AP) in a communication system supporting a 5G access technology.

A terminal in the embodiments of this application may be a device that provides a user with voice or data connectivity. For example, the terminal may also be referred to as user equipment (user equipment, UE), a mobile station (mobile station), a subscriber unit (subscriber unit), a station (station), or terminal equipment (terminal equipment, TE). The terminal may be a cellular phone (cellular phone), a personal digital assistant (personal digital assistant, PDA), a wireless modem (modem), a handheld (handheld) device, a laptop computer (laptop computer), a cordless phone (cordless phone), a wireless local loop (wireless local loop, WLL) station, a tablet computer (pad), or the like. With development of wireless communication technologies, a device that can access a communication system, a device that can communicate with a network side in a communication system, or a device that can communicate with another object by using a communication system may be the terminal in the embodiments of this application, for example, a terminal and a vehicle in intelligent transportation, a household device in a smart household, an electric meter reading instrument in a smart grid, a voltage monitoring instrument, an environment monitoring instrument, a video surveillance instrument in an intelligent security network, or a cash register. In the embodiments of this application, the terminal may communicate with an access network device, for example, the access network device 11.

First, terms in the embodiments of the present invention are explained and described.

(1) Slot (slot): The slot is a minimum scheduling unit of a time domain resource.

In NR, a format of a slot may include 14 OFDM symbols, and a CP (cyclic prefix (Cyclic Prefix, CP)) of each OFDM symbol is a normal CP. Alternatively, a format of a slot may include 12 OFDM symbols, and a CP of each OFDM symbol is an extended CP. Alternatively, a format of a slot may include seven OFDM symbols, and a CP of each OFDM symbol is a normal CP.

OFDM symbols in one slot may be all used for uplink transmission, or may be all used for downlink transmission. Alternatively, a part of OFDM symbols in one slot may be used for downlink transmission, a part of the OFDM symbols may be used for uplink transmission, and a part of the OFDM symbols may be reserved but are not for transmission. It should be understood that the foregoing illustration is merely an example for description, and shall not constitute any limitation on this application. In consideration of system forward compatibility, the slot format is not limited to the foregoing examples. In NR, based on different subcarrier spacings, 1 ms may include different quantities of slots (slots). For example, when a subcarrier spacing is 15 kHz, 1 ms includes one slot, and the slot occupies 1 ms; when a subcarrier spacing is 30 kHz, 1 ms includes two slots, and each slot occupies 0.5 ms.

(2) Symbol (symbol): The symbol is a minimum unit of a time domain resource.

A time length of one symbol is not limited in the embodiments of this application. A length of one symbol may vary for different subcarrier spacings. Symbols may include an uplink symbol and a downlink symbol. By way of example, and not limitation, the uplink symbol may be referred to as, for example, a single-carrier frequency division multiple access (Single-Carrier Frequency Division Multiple Access, SC-FDMA) symbol or an orthogonal frequency division multiplexing (Orthogonal Frequency Division Multiplexing, OFDM) symbol; the downlink symbol may be referred to as, for example, an OFDM symbol.

(3) Time division duplex (time division duplex, TDD): The TDD is a duplex communication technology in a communication system, and is used to separate a receive channel and a transmit channel, namely, an uplink and a downlink. In a communication system using a TDD mode, a same frequency domain resource is used for an uplink and a downlink, and the uplink and the downlink are distinguished by using different time domain resources.

In LTE, there are seven types of TDD configurations. One frame includes 10 subframes. If D represents a downlink subframe and U represents an uplink subframe, an arrangement order of Ds and Us is fixed in each configuration. In a cell, a TDD configuration may be a semi-persistent configuration or a static configuration.

In NR, TDD may also be referred to as dynamic TDD. A slot is a minimum time unit that can be scheduled. To perform scheduling more flexibly, configurations of different types of slots in each frame may dynamically change, and a quantity of slots included in each frame also varies with a subcarrier spacing. Based on different slot types, a slot may be an uplink-only slot, a downlink-only slot, an uplink dominant (uplink dominated) slot, a downlink dominant (downlink dominated) slot, or the like. Symbols in the uplink-only slot are all uplink symbols. Symbols in the downlink-only slot are all downlink symbols. A quantity of uplink symbols is greater than a quantity of downlink symbols in the uplink-dominant slot. A quantity of downlink symbols is greater than a quantity of uplink symbols in the downlink-dominant slot. In addition, a guard period may be configured between uplink and downlink symbols.

That is, in the TDD mode, one slot may be used for uplink transmission or used for downlink transmission. An access network device notifies an uplink-downlink slot configuration by using a system information block (system information block, SIB).

(4) Frequency division duplex (frequency division duplex, FDD): The FDD is a duplex communication technology in a communication system, and is used to separate a receive channel and a transmit channel, namely, an uplink and a downlink. In a communication system using an FDD mode, a same time domain resource is used for an uplink and a downlink, and the uplink and the downlink are distinguished by using different frequency domain resources. For example, an uplink frequency range is different from a downlink frequency range.

For a communication system supporting an FDD mode, a receive channel and a transmit channel are uninterrupted in time, and a frequency band needs to be configured for each of the receive channel and the transmit channel. 10 subframes of each radio frame may be all used for downlink transmission or uplink transmission, and the uplink transmission and downlink transmission are performed separately in different frequency bands.

(5) Time Domain Resource Configuration

The time domain resource configuration is used for uplink transmission, downlink transmission, or a flexible time domain resource.

Specifically, the configuration may be performed by using one or more indications of a cell-level semi-persistent configuration, a user-level semi-persistent configuration, and a user-level dynamic configuration. The following describes the cell-level semi-persistent configuration, the user-level semi-persistent configuration, and the user-level dynamic configuration.

Cell-Level Semi-Persistent Configuration

Cell-level semi-persistent configuration information may include a reference subcarrier spacing, a time domain resource periodicity, and time domain resource allocation information corresponding to the reference subcarrier spacing. The time domain resource allocation information corresponding to the reference subcarrier spacing includes a quantity of downlink slots, a quantity of downlink symbols, a quantity of uplink slots, and a quantity of uplink symbols. For example, the quantity of downlink slots is m, the quantity of downlink symbols is x, the quantity of uplink slots is n, and the quantity of uplink symbols is y.

Figure 2A:
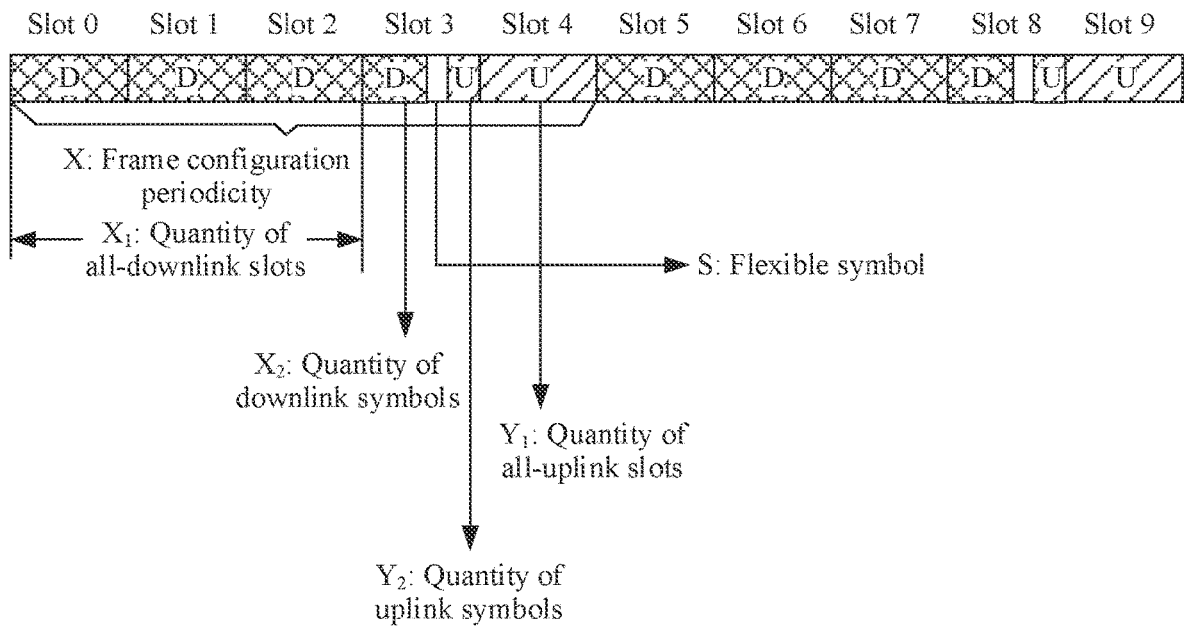
FIG. 2A is a schematic diagram of a frame configuration according to an embodiment of this application.
Figure 2B:
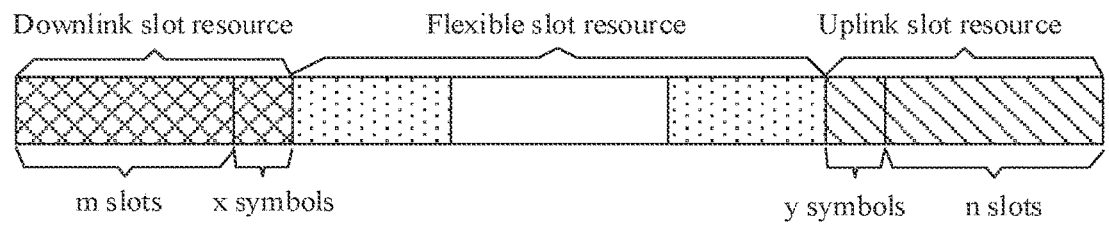
FIG. 2B is another schematic diagram of a frame configuration according to an embodiment of this application.

A time domain resource indicated by the cell-level semi-persistent configuration information may be determined in a sequence of a downlink time domain resource, a flexible time domain resource, and an uplink time domain resource, as shown in FIG. 2B. Different time domain resources are distinguished by using different shadows in FIG. 2B. For example, a block filled with grids represents a downlink time domain resource, a shadow filled with dots represents a flexible time domain resource, and a shadow filled with slashes represents an uplink time domain resource. For example, the downlink time domain resource includes m slots and x symbols after the m slots, the uplink time domain resource may include n slots and y symbols before the n slots, and the flexible time domain resources may be contiguous time domain resources between the downlink time domain resource and the uplink time domain resource, and may include contiguous flexible slots and contiguous flexible symbols before and after the flexible slot.

After receiving the cell-level semi-persistent configuration information, a terminal may determine, based on the cell-level semi-persistent configuration information and a relationship between a subcarrier spacing of a BWP and the reference subcarrier spacing, time domain resource allocation corresponding to the subcarrier spacing of the BWP.

The cell-level semi-persistent configuration information may be carried in a radio resource control (radio resource control, RRC) layer message.

User-Level Semi-Persistent Configuration

The user-level semi-persistent configuration information may be used to further configure a slot that has been configured by using the cell-level semi-persistent configuration information, and the cell-level semi-persistent configuration information may indicate that at least one symbol of the slot is a flexible symbol. The user-level semi-persistent configuration information may be used to configure the at least one flexible symbol of the slot that has been configured by using the cell-level semi-persistent configuration information. For example, the user-level semi-persistent configuration information may indicate that the at least one flexible symbol is an uplink symbol or a downlink symbol. The user-level semi-persistent configuration information may be used to configure an uplink symbol or a downlink symbol of the slot that has been configured by using the cell-level semi-persistent configuration information still as an uplink symbol or a downlink symbol. Alternatively, a slot configured by using the user-level semi-persistent configuration information may not be configured by using the cell-level semi-persistent configuration information.

The user-level semi-persistent configuration information may be used to configure a time domain resource by using a reference subcarrier spacing, and the reference subcarrier spacing may be the same as the subcarrier spacing in the cell-level semi-persistent configuration information.

The user-level semi-persistent configuration information may include an index (index) of at least one slot, and a quantity of downlink symbols and a quantity of uplink symbols in the at least one slot. The index of the at least one slot may be an index of a slot in a time domain resource that has been configured by using the cell-level semi-persistent configuration information or a location relative to a current slot, for example, the current slot, a slot next to the current slot, or the second slot after the current slot.

Figure 2C:
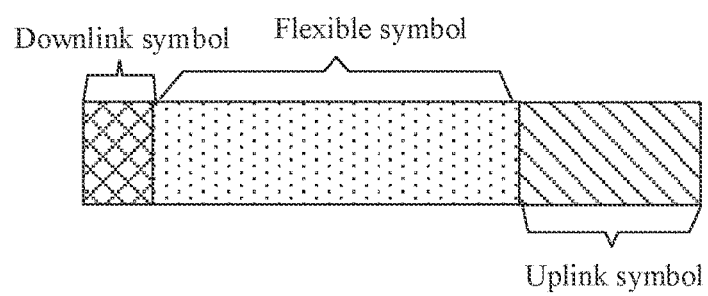
FIG. 2C is another schematic diagram of a frame configuration according to an embodiment of this application.

FIG. 2C is a schematic diagram of a time domain resource indicated by user-level semi-persistent configuration information, as shown in FIG. 2C. The user-level semi-persistent configuration information may indicate one or more slots, and each slot may be determined in a sequence of a downlink symbol, a flexible symbol, and an uplink symbol. The flexible symbol is a symbol between the downlink symbol and the uplink symbol.

The user-level semi-persistent configuration information may be carried in a radio resource control (radio resource control, RRC) layer message.

User-Level Dynamic Configuration

The user-level dynamic configuration information may be used to further configure a time domain resource that has been configured by using the cell-level semi-persistent configuration information, and the cell-level semi-persistent configuration information may indicate that at least one symbol of one slot is a flexible symbol. The user-level dynamic configuration information may be used to configure the at least one flexible symbol of the slot that has been configured by using the cell-level semi-persistent configuration information. For example, the user-level dynamic configuration information may indicate that the at least one flexible symbol is an uplink symbol or a downlink symbol. The user-level dynamic configuration information may be used to still configure an uplink symbol or a downlink symbol of the slot that has been configured by using the cell-level semi-persistent configuration information as an uplink symbol or a downlink symbol. For example, time domain resources corresponding to an uplink BWP and a downlink BWP of unpaired spectrums may be first configured by using the cell-level semi-persistent configuration information, and then may be configured by using the user-level dynamic configuration information.

The user-level dynamic configuration information may be used to further configure a time domain resource that has been configured by using the user-level semi-persistent configuration information, and the user-level semi-persistent configuration information may indicate that at least one symbol of one slot is a flexible symbol. The user-level dynamic configuration information may be used to configure the at least one flexible symbol of the slot that has been configured by using the user-level semi-persistent configuration information. For example, the user-level dynamic configuration information may indicate that the at least one flexible symbol is an uplink symbol or a downlink symbol. The user-level dynamic configuration information may be used to still configure an uplink symbol or a downlink symbol of the slot that has been configured by using the user-level semi-persistent configuration information as an uplink symbol or a downlink symbol. For example, time domain resources corresponding to an uplink BWP and a downlink BWP of unpaired spectrums may be first configured by using the user-level semi-persistent configuration information, and then may be configured by using the user-level dynamic configuration information.

The user-level dynamic configuration information may be used to configure a time domain resource that has not been configured by using the cell-level semi-persistent configuration information or the user-level semi-persistent configuration information; in other words, the time domain resource is directly configured by using the user-level dynamic configuration information without being configured by using the cell-level semi-persistent configuration information or the user-level semi-persistent configuration information. For example, time domain resources corresponding to an uplink BWP and a downlink BWP of paired spectrums may be directly configured by using the user-level dynamic configuration information without being configured by using the cell-level semi-persistent configuration information or the user-level semi-persistent configuration information.

The user-level dynamic configuration information may be used to configure a time domain resource by using a reference subcarrier spacing, and the reference subcarrier spacing may be the same as the reference subcarrier spacing of the cell-level semi-persistent configuration information or the reference subcarrier spacing of the user-level semi-persistent configuration information. For example, the reference subcarrier spacing is 15 kHz.

The user-level dynamic configuration information may be carried in downlink control information (downlink control information, DCI) signaling.

(6) Time Division Multiplexing Mode

In the embodiments of this application, the time division multiplexing (time division multiplexing, TDM) mode may mean that transmission on a plurality of uplink carriers is performed in the time division multiplexing mode, and uplink time domain resources of the plurality of uplink carriers do not overlap.

It may be understood that when transmission on a first carrier and a second carrier is performed in the time division multiplexing mode, it may be understood that a time domain resource of the first carrier does not overlap a time domain resource of the second carrier, or a time domain resource of the first carrier is different from a time domain resource of the second carrier, or data is not simultaneously sent on the first carrier and the second carrier, or sending is not simultaneously performed on the first carrier and the second carrier, or sending is performed on the first carrier or the second carrier, or only one uplink carrier is used for sending at a time, or the like.

The embodiments of the present invention provide a communication method. An access network device sends a plurality of pieces of TDM mode information to a terminal, where each of the plurality of pieces of TDM mode information is used to indicate a TDM mode between an uplink time domain resource of a first carrier and a time domain resource of a second carrier. The access network device sends first information to the terminal, where the first information is used to indicate one of the plurality of TDM modes. It can be learned that in the embodiments of this application, the access network device may configure the plurality of TDM modes for the terminal, and activate one of the plurality of TDM modes. The terminal may perform transmission on a plurality of uplink carriers, for example, the first carrier and the second carrier, in the TDM mode based on the uplink time domain resources indicated by the TDM mode information. The terminal may perform transmission on the plurality of uplink carriers in the TDM mode, so that a rate requirement of a 5G communication system can be satisfied, and performance of a single carrier does not deteriorate. Therefore, an uplink radio resource can be effectively used, and uplink communication performance can be improved.

Figure 3A:
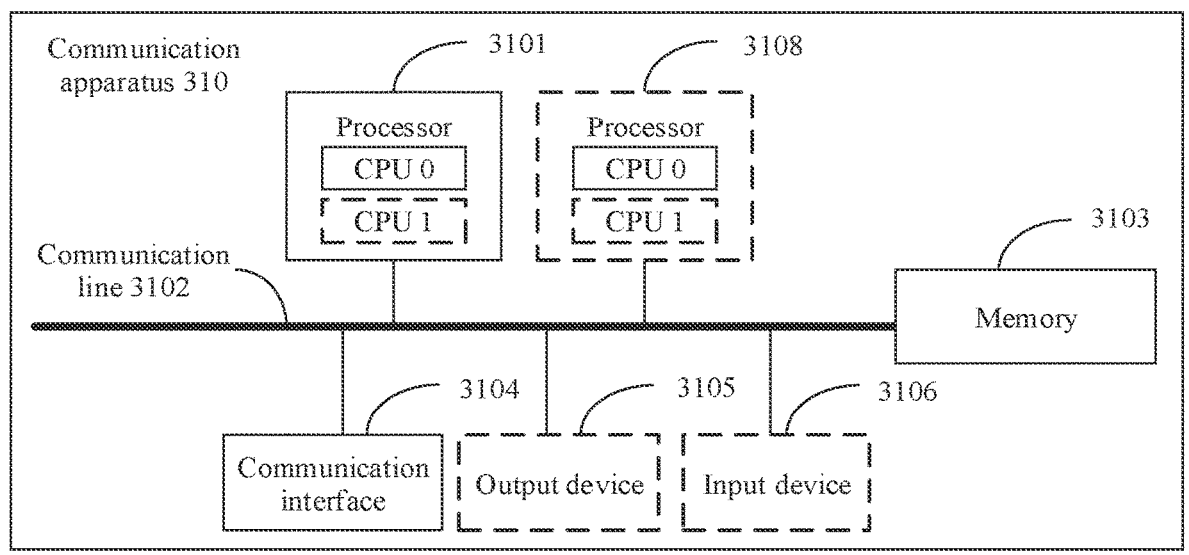
FIG. 3A is a block diagram of a structure of a terminal according to an embodiment of this application.

The terminal in the embodiments of the present invention may be implemented by using a communication apparatus 310 in FIG. 3A. FIG. 3A is a schematic diagram of a hardware structure of a communication apparatus 310 according to an embodiment of this application. The communication apparatus 310 includes a processor 3101, a communication line 3102, a memory 3103, and at least one communication interface (in FIG. 3A, only an example in which the communication apparatus 310 includes a communication interface 3104 is used for description).

The processor 3101 may be a general-purpose central processing unit (central processing unit, CPU), a microprocessor, an application-specific integrated circuit (application-specific integrated circuit, ASIC), or one or more integrated circuits configured to control program execution of the solutions in this application.

The communication line 3102 may include a path for transferring information between the foregoing components.

The communication interface 3104 uses any transceiver-type apparatus, to communicate with another device or a communication network such as the Ethernet, a radio access network (radio access network, RAN), or a wireless local area network (wireless local area network, WLAN).

The memory 3103 may be a read-only memory (read-only memory, ROM) or another type of static storage device capable of storing static information and instructions, or a random access memory (random access memory, RAM) or another type of dynamic storage device capable of storing information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compressed optical disc, a laser disc, an optical disc, a digital versatile optical disc, a Blu-ray disc, or the like), a magnetic disk storage medium or another magnetic storage device, or any other medium that can be configured to carry or store expected program code in a form of an instruction or a data structure and that can be accessed by a computer. However, the memory 3103 is not limited thereto. The memory may exist independently, and is connected to the processor through the communication line 3102. The memory may alternatively be integrated with the processor.

The memory 3103 is configured to store a computer-executable instruction for executing the solutions of this application, and the processor 3101 controls the execution. The processor 3101 is configured to execute computer-executable instructions stored in the memory 3103, to implement the intent processing method provided in the following embodiments of this application.

Optionally, the computer-executable instructions in this embodiment of this application may also be referred to as application program code. This is not specifically limited in this embodiment of this application.

During specific implementation, in an embodiment, the processor 3101 may include one or more CPUs, for example, a CPU 0 and a CPU 1 in FIG. 3A.

During specific implementation, in an embodiment, the communication apparatus 310 may include a plurality of processors, for example, the processor 3101 and a processor 3108 shown in FIG. 3A. Each of the processors may be a single-core (single-CPU) processor, or may be a multi-core (multi-CPU) processor. Herein, the processor may be one or more devices, circuits, and/or processing cores configured to process data (for example, computer program instructions).

During specific implementation, in an embodiment, the communication apparatus 310 may further include an output device 3105 and an input device 3106. The output device 3105 communicates with the processor 3101, and may display information in a plurality of manners. For example, the output device 3105 may be a liquid crystal display (liquid crystal display, LCD), a light emitting diode (light emitting diode, LED) display device, a cathode ray tube (cathode ray tube. CRT) display device, or a projector (projector). The input device 3106 communicates with the processor 3101, and may receive input of a user in a plurality of manners. For example, the input device 3106 may be a mouse, a keyboard, a touchscreen device, or a sensing device.

The communication apparatus 310 may be a general-purpose device or a special-purpose device. During specific implementation, the communication apparatus 310 may be a desktop computer, a portable computer, a network server, a palmtop computer (personal digital assistant, PDA), a mobile phone, a tablet computer, a wireless terminal apparatus, an embedded device, or a device having a structure similar to that in FIG. 3A. A type of the communication apparatus 310 is not limited in this embodiment of this application.

Figure 3B:
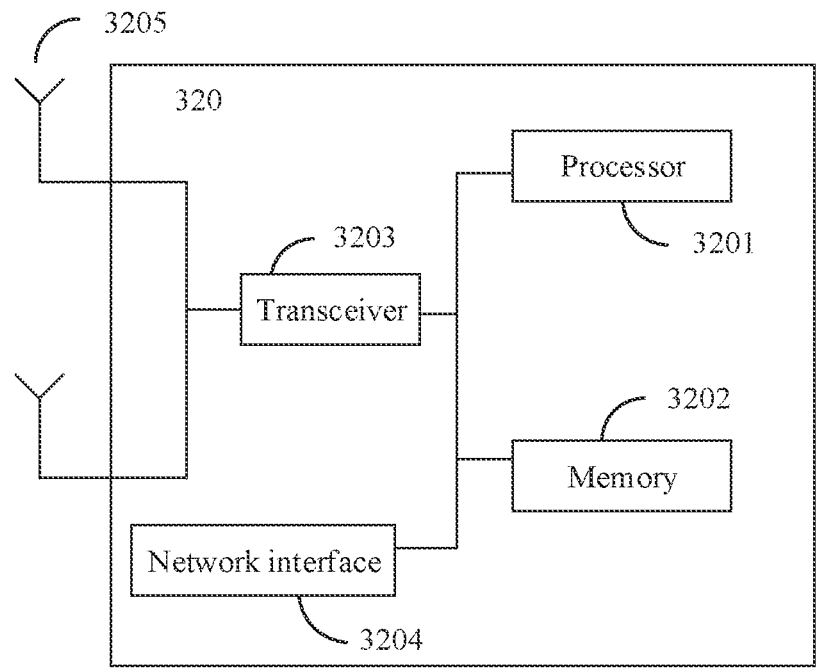
FIG. 3B is a block diagram of a structure of an access network device according to an embodiment of this application.

FIG. 3B is a schematic diagram of a structure of an access network device. For a structure of an access network device 320, refer to the structure shown in FIG. 3B.

The access network device includes at least one processor 3201, at least one memory 3202, at least one transceiver 3203, at least one network interface 3204, and one or more antennas 3205. The processor 3201, the memory 3202, the transceiver 3203, and the network interface 3204 are connected, for example, through a bus. The antenna 3205 is connected to the transceiver 3203. The network interface 3204 is configured to enable the access network device to be connected to another communication device through a communication link. For example, the access network device is connected to a core network element through an S1 interface. In this embodiment of this application, the connection may include various types of interfaces, transmission lines, buses, or the like. This is not limited in this embodiment.

In this embodiment of this application, the processor, such as the processor 3201, may include at least one of the following types: a general-purpose central processing unit (Central Processing Unit, CPU), a digital signal processor (Digital Signal Processor, DSP), a microprocessor, an application-specific integrated circuit (Application-Specific Integrated Circuit, ASIC), a microcontroller unit (Microcontroller Unit, MCU), a field programmable gate array (Field Programmable Gate Array, FPGA), or an integrated circuit configured to implement a logical operation. For example, the processor 3201 may be a single-core (single-CPU) processor or a multi-core (multi-CPU) processor. The at least one processor 3201 may be integrated into one chip or located on a plurality of different chips.

In this embodiment of this application, the memory, such as the memory 3202, may include at least one of the following types: a read-only memory (read-only memory, ROM) or another type of static storage device that can store static information and instructions, a random access memory (random access memory, RAM) or another type of dynamic storage device that can store information and instructions, or may be an electrically erasable programmable read-only memory (Electrically erasable programmable read-only memory, EEPROM). In some scenarios, the memory may alternatively be a compact disc read-only memory (compact disc read-only memory, CD-ROM) or another compact disc storage medium, an optical disc storage medium (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, the memory is not limited thereto.

The memory 3202 may exist independently, and is connected to the processor 3201. Optionally, the memory 3202 may alternatively be integrated with the processor 3201. For example, the memory 3202 and the processor 3201 are integrated into one chip. The memory 3202 can store program code for performing the technical solutions in the embodiments of this application, and the processor 3201 controls execution of the program code. Various types of executed computer program code may also be considered as drivers of the processor 3201. For example, the processor 3201 is configured to execute the computer program code stored in the memory 3202, to implement the technical solutions in the embodiments of this application.

The transceiver 3203 may be configured to support receiving or sending of a radio frequency signal between the access network device and a terminal, and the transceiver 3203 may be connected to the antenna 3205. Specifically, the one or more antennas 3205 may receive a radio frequency signal. The transceiver 3203 may be configured to: receive the radio frequency signal from the antenna, convert the radio frequency signal into a digital baseband signal or a digital intermediate frequency signal, and provide the digital baseband signal or the digital intermediate frequency signal for the processor 3201, so that the processor 3201 further processes the digital baseband signal or the digital intermediate frequency signal, for example, performs demodulation processing and decoding processing. In addition, the transceiver 3203 may be configured to: receive a modulated digital baseband signal or digital intermediate frequency signal from the processor 3201, convert the modulated digital baseband signal or digital intermediate frequency signal into a radio frequency signal, and send the radio frequency signal through the one or more antennas 3205. Specifically, the transceiver 3203 may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transceiver 3203 may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals. The transceiver may be referred to as a transceiver circuit, a transceiver unit, a transceiver component, a sending circuit, a sending unit, a sending component, or the like.

Figure 4:
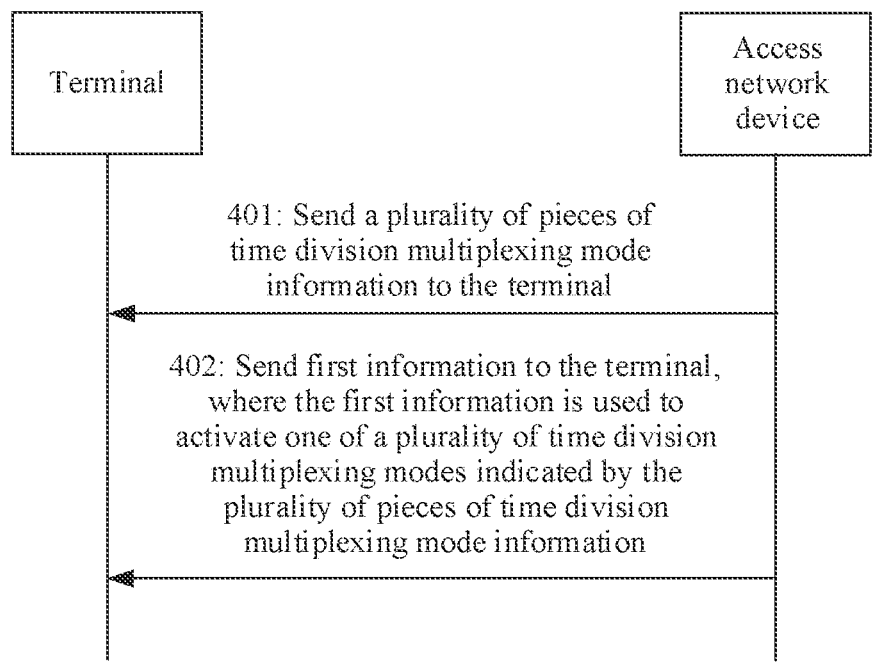
FIG. 4 is a schematic flowchart of a resource configuration method according to an embodiment of this application.

An embodiment of the present invention provides a resource configuration method, applied to the communication system shown in FIG. 1. As shown in FIG. 4, the method includes the following steps.

401: The access network device sends a plurality of pieces of time division multiplexing mode information to the terminal.

Each of the plurality of pieces of time division multiplexing mode information is used to indicate one time division multiplexing mode. In the time division multiplexing mode, time division multiplexing is performed on a first uplink time domain resource and a second uplink time domain resource, the first uplink time domain resource is an uplink time domain resource of a first carrier, and the second uplink time domain resource is an uplink time domain resource of a second carrier.

It should be noted that one piece of time division multiplexing mode information is used to indicate one time division multiplexing mode. The time division multiplexing mode in this embodiment of this application means that transmission on a plurality of carriers is performed in the time division multiplexing mode. For example, transmission on the first carrier and the second carrier is performed in the time division multiplexing mode. It may be understood that when transmission on the first carrier and the second carrier is performed in the time division multiplexing mode, a time domain resource of the first carrier and a time domain resource of the second carrier are also in the time division multiplexing mode. Therefore, the first uplink time domain resource and the second uplink time domain resource do not overlap; or the first uplink time domain resource and the second uplink time domain resource are different.

During specific implementation, the access network device may determine an uplink time domain resource initially configured on each carrier (which is referred to as an initially configured time domain resource for short below). The initially configured time domain resource is a time domain resource configured by the access network device for each carrier by using the foregoing time domain resource configuration method (which may include one or more of the cell-level semi-persistent configuration, the user-level semi-persistent configuration, and the user-level dynamic configuration). The initially configured time domain resource may include an uplink time domain resource, a downlink time domain resource, and a flexibly configured resource.

For example, refer to FIG. 2A, the uplink time domain resource in the initially configured time domain resource may be an all-uplink slot configured as "U" in FIG. 2A, for example, a slot (slot) 4. The uplink time domain resource in the initially configured time domain resource may alternatively be symbols configured as "U" in FIG. 2A, for example, the last several symbols in a slot 3. The downlink time domain resource in the initially configured time domain resource may be an all-downlink slot configured as "D" in FIG. 2A, for example, a slot 0. The downlink time domain resource in the initially configured time domain resource may alternatively be symbols configured as "D" in FIG. 2A, for example, the first several symbols in the slot 3. The flexibly configured resource in the initially configured time domain resource may be a flexible symbol configured as "S" in FIG. 2A, for example, several blank symbols in the slot 3 shown in FIG. 2A. The flexible symbol is not configured as an uplink resource or a downlink resource, and the access network device may further subsequently configure the flexible symbol based on an actual requirement.

In addition, the initially configured time domain resources of the carriers may overlap. The first carrier and the second carrier are used as an example. An initially configured time domain resource of the first carrier may be referred to as a first time domain resource, and an initially configured time domain resource of the second carrier may be referred to as a second time domain resource. The first time domain resource and the second time domain resource overlap.

The access network device may further determine an uplink time domain resource of each carrier in the time division multiplexing mode based on the initially configured time domain resource of each carrier. In the time division multiplexing mode, the uplink time domain resources of the carriers do not overlap. The first carrier and the second carrier are used as an example. In the time division multiplexing mode, an uplink time domain resource of the first carrier may be referred to as a first uplink time domain resource, and an uplink time domain resource of the second carrier may be referred to as a second uplink time domain resource. Time division multiplexing is performed on the first uplink time domain resource and the second uplink time domain resource, that is, the first uplink time domain resource and the second uplink time domain resource do not overlap.

It should be noted that the access network device may configure, in the following two manners, the uplink time domain resource for each carrier in the time division multiplexing mode. The manners specifically include:

In a first manner, in the time division multiplexing mode, an uplink time domain resource of a carrier continues to use an uplink time domain resource in an initially configured time domain resource of the carrier, and an uplink time domain resource configured for another carrier is an available time domain resource in an initially configured time domain resource. Time division multiplexing is also performed on the uplink time domain resources of the carriers in the time division multiplexing mode.

The first carrier and the second carrier are used as an example. In a possible implementation, the first uplink time domain resource is an available time domain resource in the first time domain resource (namely, the initially configured time domain resource of the first carrier), the second uplink resource is an uplink time domain resource in the second time domain resource (namely, the initially configured time domain resource of the second carrier), and time division multiplexing is performed on the available time domain resource in the first time domain resource and the uplink time domain resource in the second time domain resource.

It may be understood that the first uplink time domain resource is an uplink time domain resource initially configured on the first carrier, first time division multiplexing mode information indicates that a part of an uplink time domain resource initially configured on the second carrier is the second uplink time domain resource, and the first uplink time domain resource overlaps the uplink time domain resource initially configured on the second carrier.

In other words, an uplink resource configuration of the second carrier in the multicarrier time division multiplexing mode continues to use an initial configuration, that is, the uplink time domain resource of the second carrier in the multicarrier time division multiplexing mode is the same as the uplink time domain resource in the initially configured time domain resource of the second carrier. Therefore, the access network device may reconfigure an uplink time domain resource only for the first carrier, so that time division multiplexing is performed on the first carrier and the second carrier.

Specifically, the uplink time domain resource reconfigured by the access network device for the first carrier is referred to as the first uplink time domain resource. The first uplink time domain resource may be an available time domain resource in the initially configured resource of the first carrier. For example, the first uplink time domain resource may be an uplink time domain resource in the initially configured resource of the first carrier.

For example, the first time division multiplexing mode information indicates the first uplink time domain resource. The terminal may determine a time division multiplexing mode based on the first time division multiplexing mode information, to be specific, transmission on the first carrier is performed on the first uplink time domain resource indicated by the first time division multiplexing information, and transmission on the second carrier is performed on the uplink time domain resource in the initially configured resource.

The first carrier and the second carrier are still used as an example. In another possible implementation, the first uplink time domain resource is an uplink time domain resource in the first time domain resource (namely, the initially configured time domain resource of the first carrier), the second uplink resource is an available time domain resource in the second time domain resource (namely, the initially configured time domain resource of the second carrier), and time division multiplexing is performed on the uplink time domain resource in the first time domain resource and the available time domain resource in the second time domain resource.

In other words, an uplink resource configuration of the first carrier in the multicarrier time division multiplexing mode continues to use an initial configuration, that is, the uplink time domain resource of the first carrier in the multicarrier time division multiplexing mode is the same as the uplink time domain resource in the initially configured time domain resource of the first carrier. Therefore, the access network device may reconfigure an uplink time domain resource only for the second carrier, so that time division multiplexing is performed on the first carrier and the second carrier.

Specifically, the uplink time domain resource reconfigured by the access network device for the second carrier is referred to as the second uplink time domain resource. The second uplink time domain resource may be an available time domain resource in the initially configured resource of the second carrier. For example, the second uplink time domain resource may be an uplink time domain resource in the initially configured resource of the second carrier, or may be a downlink time domain resource in the initially configured resource of the second carrier, or may be a flexibly configured resource in the initially configured resource of the second carrier.

For example, first time division multiplexing mode information indicates the second uplink time domain resource. The terminal may determine a time division multiplexing mode based on the first time division multiplexing mode information, to be specific, transmission on the second carrier is performed on the second uplink time domain resource indicated by the first time division multiplexing information, and transmission on the first carrier is performed on the uplink time domain resource in the initially configured resource.

In a second manner, in the time division multiplexing mode, the uplink time domain resource configured for each carrier is an available time domain resource in the initially configured time domain resource, and time division multiplexing is also performed on the uplink time domain resources of the carriers in the time division multiplexing mode.

The first carrier and the second carrier are used as an example. The first uplink time domain resource is an available time domain resource in the first time domain resource (namely, the initially configured time domain resource of the first carrier), the second uplink resource is an available time domain resource in the second time domain resource (namely, the initially configured time domain resource of the second carrier), and time division multiplexing is performed on the available time domain resource in the first time domain resource and the available time domain resource in the second time domain resource.

In other words, uplink resource configurations of the first carrier and the second carrier in the multi-carrier time division multiplexing mode do not use initial configurations. The access network device may reconfigure uplink time domain resources for the first carrier and the second carrier, so that time division multiplexing is performed on the first carrier and the second carrier.

It may be understood that first time division multiplexing mode information may indicate that a part of an uplink time domain resource initially configured on the first carrier is the first uplink time domain resource, and indicate that a part of an uplink time domain resource initially configured on the second carrier is the second uplink time domain resource, and the uplink time domain resource initially configured on the first carrier overlaps the uplink time domain resource initially configured on the second carrier.

Specifically, the uplink time domain resource reconfigured by the access network device for the first carrier is referred to as the first uplink time domain resource. The first uplink time domain resource may be an available time domain resource in the initially configured resource of the first carrier. For example, the first uplink time domain resource may be an uplink time domain resource in the initially configured resource of the first carrier, or may be a downlink time domain resource in the initially configured resource of the first carrier, or may be a flexibly configured resource in the initially configured resource of the first carrier.

The uplink time domain resource reconfigured by the access network device for the second carrier is referred to as the second uplink time domain resource. The second uplink time domain resource may be an available time domain resource in the initially configured resource of the second carrier. For example, the second uplink time domain resource may be an uplink time domain resource in the initially configured resource of the second carrier.

For example, the first time division multiplexing mode information indicates the first uplink time domain resource and the second uplink time domain resource. The terminal may determine a time division multiplexing mode based on the first time division multiplexing mode information, to be specific, transmission on the first carrier is performed on the first uplink time domain resource indicated by the first time division multiplexing information, and transmission on the second carrier is performed on the second uplink time domain resource indicated by the first time division multiplexing information.

In a possible implementation, for each carrier, the first time division multiplexing mode information includes a plurality of pieces of indication information and a plurality of slot identifiers, and the plurality of pieces of indication information correspond one-to-one to the plurality of slot identifiers.

For example, the indication information may be one bit, and is used to indicate that a slot indicated by the slot identifier corresponding to the indication information is an available time domain resource. For example, the indication information is "1", a slot indicated by the slot identifier corresponding to the indication information is a slot 0, and the first time division multiplexing mode information may indicate that the slot 0 is an available time domain resource, namely, a time domain resource that can be used for uplink transmission in the time division multiplexing mode. The slot 0 may be an all-uplink slot in the initially configured resource.

For example, the indication information may alternatively be M bits, and is used to indicate that sonic symbols in a slot indicated by the slot identifier corresponding to the indication information are available time domain resources. For example, the indication information is "101" a slot indicated by the slot identifier corresponding to the indication information is a slot 3, and the first time division multiplexing mode information may indicate that the last symbol and the last but two symbol in the slot 3 are available time domain resources, namely, time domain resources that can be used for uplink transmission in the time division multiplexing mode. The slot 3 may be a flexibly configured slot in the initially configured resource.

It should be noted that the slot identifier may be a slot index.

Correspondingly, the terminal receives the plurality of pieces of time division multiplexing mode information from the access network device.

402: The access network device sends first information to the terminal, where the first information is used to activate one of the plurality of time division multiplexing modes indicated by the plurality of pieces of time division multiplexing mode information.

Specifically, the first information may include an index of one time division multiplexing mode, and is used to indicate one of the plurality of time division multiplexing modes.

In a possible implementation, the access network device determines X time division multiplexing modes, and an index of the time division multiplexing mode may be $\lceil \log_2 X \rceil$ bits, where "⌈ ⌉" represents a rounding up operation. For example, the access network device determines three time division multiplexing modes, an index of the time division multiplexing mode may be two bits, and any three of "00", "01" "10", and "11" may be used to indicate three different time division multiplexing modes.

Correspondingly, the terminal receives the first information from the access network device.

In a possible implementation, the plurality of pieces of time division multiplexing mode information are carried by using a radio resource control (radio resource control, RRC) message, and the first information is carried by using downlink control information (downlink control information, DCI).

Optionally, the method provided in this embodiment of this application supports carrier aggregation (carrier aggregation, CA), to be specific, the first carrier and the second carrier support the carrier aggregation CA.

Optionally, the method provided in this embodiment of this application supports a supplementary uplink (supplementary uplink, SUL). For example, the first carrier is a normal uplink (normal uplink, NUL) carrier, and the second carrier is an SUL carrier.

Optionally, the method provided in this embodiment of this application supports dual connectivity (dual connectivity, DC). For example, the first carrier is a primary cell uplink carrier, and the second carrier is a secondary cell uplink carrier.

In a possible implementation, duplex modes of the first carrier and the second carrier are the same. For example, the first carrier is an FDD duplex mode, and the second carrier is an FDD duplex mode; or the first carrier is a TDD duplex mode, and the second carrier is a TDD duplex mode.

In a possible implementation, duplex modes of the first carrier and the second carrier are different. For example, the first carrier is an FDD duplex mode, and the second carrier is a TDD duplex mode; or the first carrier is a TDD duplex mode, and the second carrier is an FDD duplex mode.

It should be noted that, in all uplink time domain resources used for uplink transmission on the first carrier and the second carrier in the time division multiplexing mode, the first uplink time domain resource and the second uplink time domain resource adjacent to the first uplink time domain resource are contiguous in time domain. That is, there is no switching latency when the terminal switches between the first carrier and the second carrier.

Figure 5A:
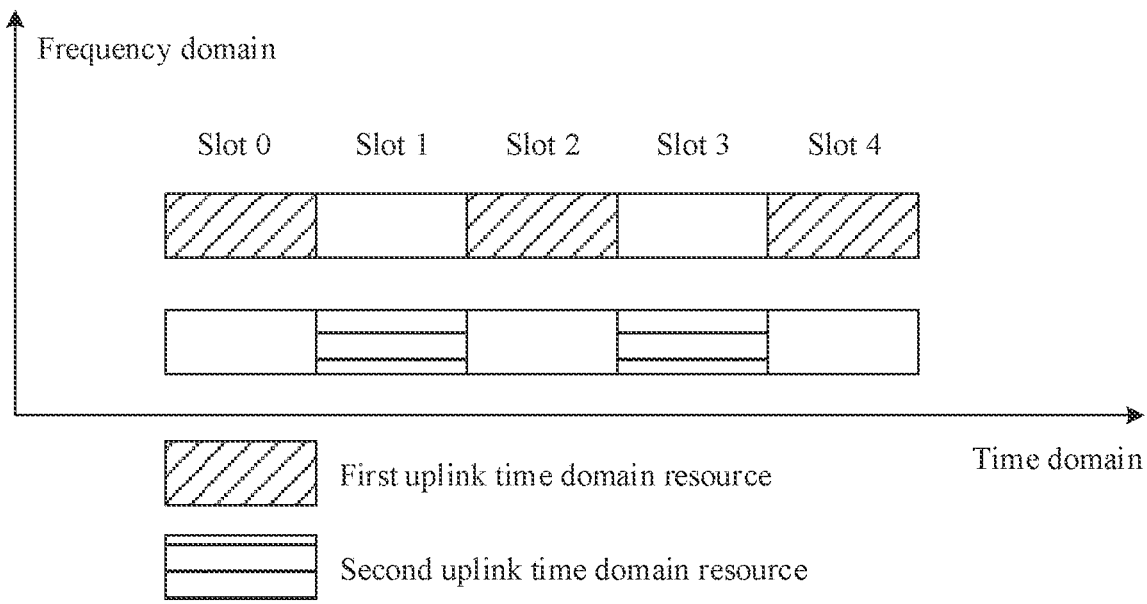
FIG. 5A is a schematic diagram of a time division multiplexing mode according to an embodiment of this application.

For example, refer to FIG. 5A, in five slots in the first half frame of a radio frame, a slot (slot) 0, a slot 2, and a slot 4 are first uplink time domain resources, and a slot 1 and a slot 3 are second uplink time domain resources.

In another possible implementation, in all uplink time domain resources used for uplink transmission on the first carrier and the second carrier in the time division multiplexing mode, the first uplink time domain resource and the second uplink time domain resource adjacent to the first uplink time domain resource are separated by one or more symbols.

Figure 5B:
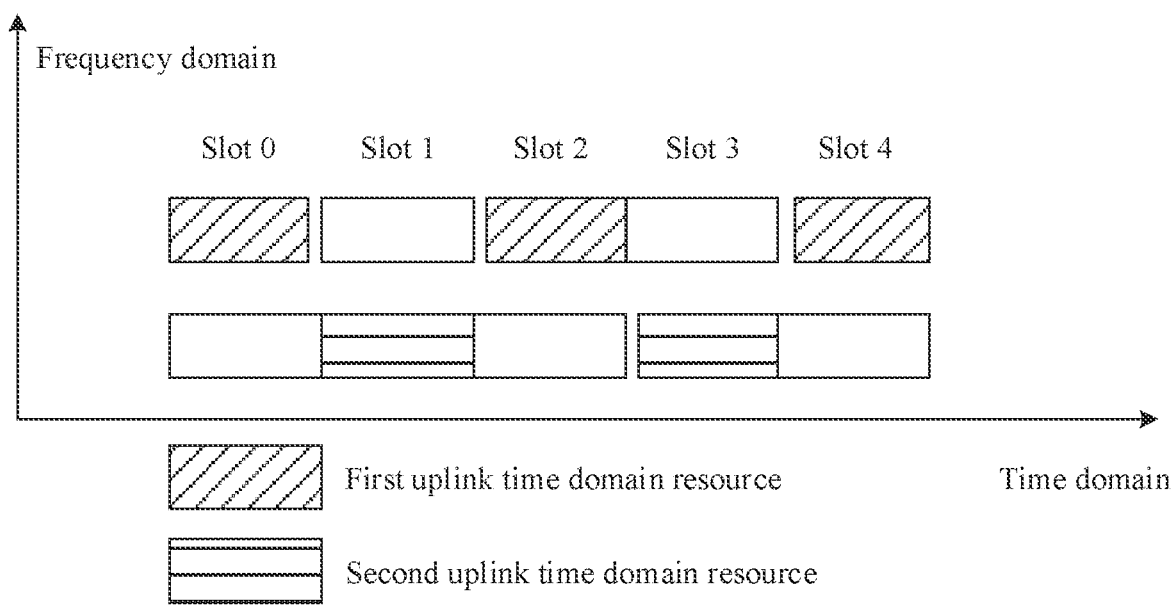
FIG. 5B is another schematic diagram of a time division multiplexing mode according to an embodiment of this application.

For example, refer to FIG. 5B, in five slots in the first half frame of a radio frame, a first uplink time domain resource in a slot (slot) 0 and a second uplink time domain resource in a slot 1 are separated by one or more symbols, the second uplink time domain resource in the slot 1 and a first uplink time domain resource in a slot 2 are separated by one or more symbols, the first uplink time domain resource in the slot 2 and a second uplink time domain resource in a slot 3 are separated by one or more symbols, and the second uplink time domain resource in the slot 3 and a first uplink time domain resource in a slot 4 are separated by one or more symbols.

In a possible implementation, the initially configured resource of the first carrier and the initially configured resource of the second carrier overlap, and the access network device may reconfigure a time domain resource/time domain resources for the first carrier and/or the second carrier of the terminal by using a plurality of patterns. In each pattern, time division multiplexing is performed on the uplink time domain resource of the first carrier and the uplink time domain resource of the second carrier.

For example, the terminal supports an uplink frequency band of 3.5 GHz and an uplink frequency band of 2.1 GHz, but does not support uplink CA. The access network device may configure a carrier of 3.5 GHz and a carrier of 2.1 GHz for the terminal, and separately schedule uplink data on the carrier of 3.5 GHz and the carrier of 2.1 GHz in the time division multiplexing mode. The carrier of 3.5 GHz may be the first carrier described in this embodiment of this application, and the carrier of 2.1 GHz may be the second carrier described in this embodiment of this application.

In a possible implementation, the carrier of 3.5 GHz is in the TDD mode, and the carrier of 2.1 GHz is in the FDD mode. The access network device may configure an initially configured time domain resource of the carrier of 3.5 GHz for the terminal by using an SIB. For example, refer to FIG. 6, in a single-carrier transmission mode, a frame configuration used for the carder of 3.5 GHz is DDDSUDDSUU, where "D" represents an all-downlink slot. "U" represents an all-uplink slot, and "S" represents a flexibly configured slot. One slot of the carrier of 3.5 GHz is 0.5 ms, and one slot includes seven symbols.

Figure 6:
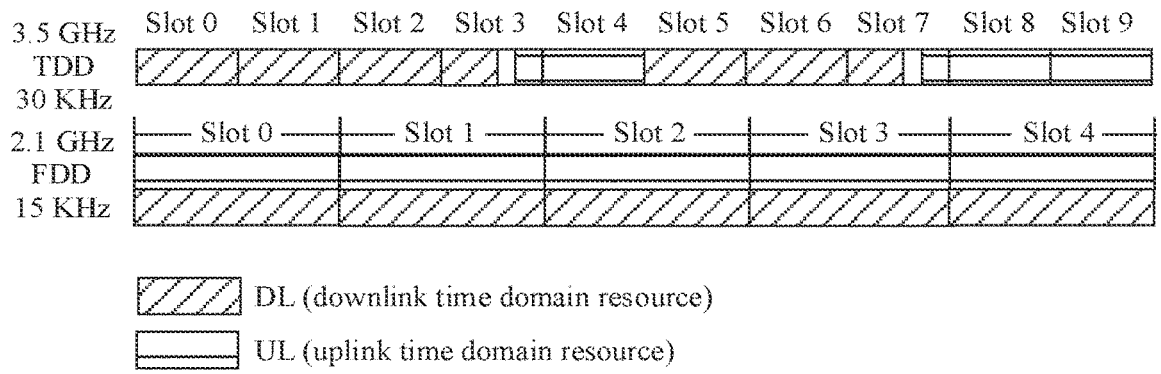
FIG. 6 is a schematic diagram of initially configuring a time domain resource according to an embodiment of this application.

Refer to FIG. 6, the carrier of 2.1 GHz is in the FDD mode, all slots may be used for an uplink, and in different frequency bands, all slots may also be used for a downlink. In addition, a subcarrier spacing of the carrier of 2.1 GHz is 15 kHz, one slot is 1 ms, and one slot includes 14 symbols.

Based on the initially configured time domain resources shown in FIG. 6, time division multiplexing modes (uplink slot patterns) that are determined by a base station and that can be used by the terminal may be the following pattern 1 to pattern 3. Examples are as follows:

(1) Pattern 1: "A configuration of the carrier of 3.5 GHz is XXXPUXXPUU, and a configuration of the carrier of 2.1 GHz is USSSX". X is a non-uplink slot, and indicates that all symbols in the slot are not used for the uplink (not scheduled or is used for the downlink). P is a self-contained slot, and indicates that a part of symbols in the slot are used for the uplink, and/or a part of the symbols in the slot are used for the downlink. For example, the last two symbols in the slot are used for the uplink. U is an all-uplink slot, and indicates that all symbols in the slot are used for the uplink.

Figure 7A:
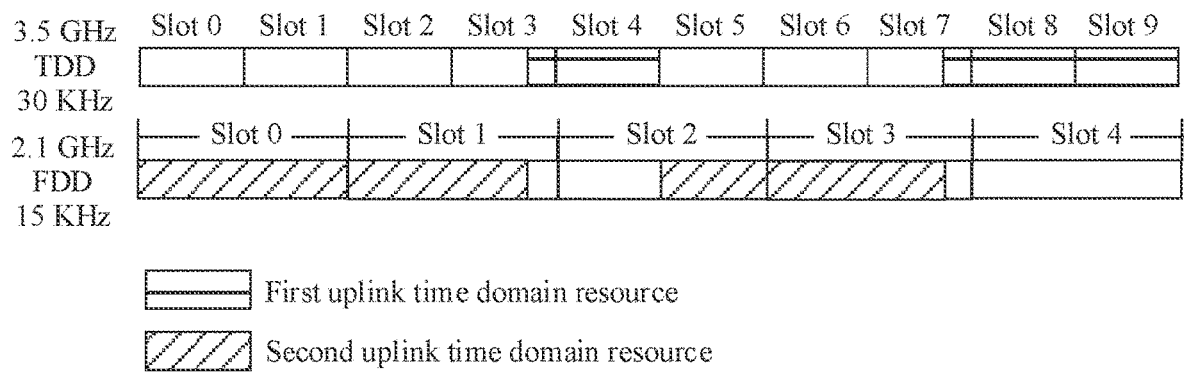
FIG. 7A is another schematic diagram of a time division multiplexing mode according to an embodiment of this application.

FIG. 7A is a schematic diagram of the pattern 1. An uplink time domain resource (namely, the first uplink time domain resource described in this embodiment of this application) of the carrier of 3.5 GHz continues to use an uplink time domain resource in the initially configured time domain resource of the carder of 3.5 GHz shown in FIG. 6, and an uplink time domain resource (namely, the second uplink time domain resource described in this embodiment of this application) is reconfigured for the carrier of 2.1 GHz.

Refer to FIG. 7A, the uplink time domain resource, namely, the first uplink slot resource, of the carrier of 3.5 GHz includes: the last two symbols in a slot 3, all symbols in a slot 4 of the carrier of 3.5 GHz, the last two symbols in a slot 7 of the carrier of 3.5 GHz, and all symbols in a slot 8 and a slot 9 of the carrier of 3.5 GHz. The uplink time domain resource, namely, the second uplink slot resource, of the carrier of 2.1 GHz includes: all symbols in a slot 0 of the carrier of 2.1 GHz, the first 12 symbols in a slot 1 of the carrier of 2.1 GHz, the last seven symbols in a slot 2 of the carrier of 2.1 GHz, and the first 12 symbols in a slot 3 of the carrier of 2.1 GHz.

In FIG. 7A, the first uplink time domain resource and the adjacent second uplink time domain resource are contiguous in time domain.

Figure 7B:
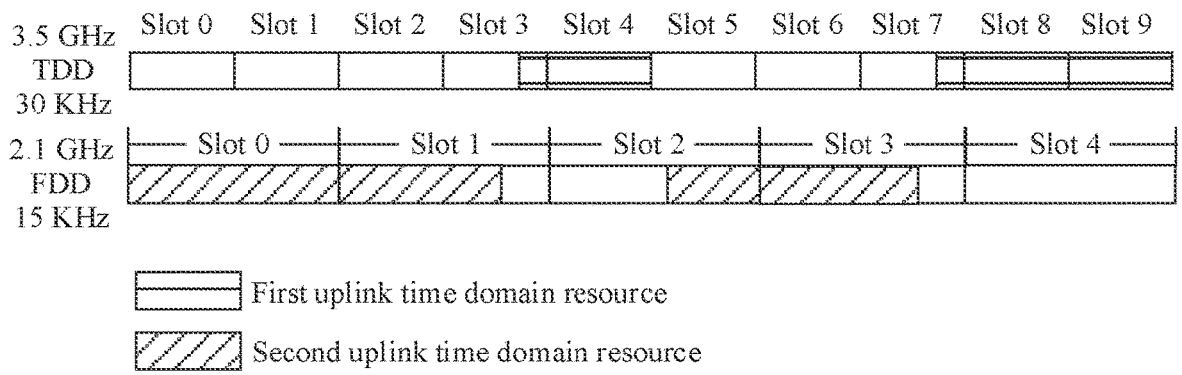
FIG. 7B is another schematic diagram of a time division multiplexing mode according to an embodiment of this application.

FIG. 7B is another schematic diagram of the pattern 1. Refer to FIG. 7B, the first uplink time domain resource and the adjacent second uplink time domain resource are separated by one or more symbols in time domain. The one or more symbols used for the separation may be a latency when the terminal switches between the first carrier and the second carrier.

For the pattern 1, one piece of time division mode information sent by the access network device to the terminal may indicate an uplink time domain resource of the carrier of 2.1 GHz. For example, the time division mode information may include a plurality of pieces of indication information, which respectively indicate all symbols in a slot 0 of the carrier of 2.1 GHz, the first 12 symbols in a slot 1 of the carrier of 2.1 GHz, the last seven symbols in a slot 2 of the carrier of 2.1 GHz, and the first 12 symbols in a slot 3 of the carrier of 2.1 GHz. For example, the indication information corresponding to the slot 0 is 1-bit "1", and is used to indicate that the slot 0 of the carrier of 2.1 GHz is all used for uplink transmission; the indication information corresponding to the slot 1 is 14-bit "11111111111100", and is used to indicate that the first 12 symbols in the slot 1 of the carrier of 2.1 GHz are used for uplink transmission; the indication information corresponding to the slot 2 is 14-bit "00000001111111", and is used to indicate that the last seven symbols in the slot 2 of the carrier of 2.1 GHz are used for uplink transmission; the indication information corresponding to the slot 3 is 14-bit "11111111111100", and is used to indicate that the first 12 symbols in the slot 3 of the carrier of 2.1 GHz are used for uplink transmission.

(2) Pattern 2: "A configuration of the carrier of 3.5 GHz is XXXXXXXXPXX, and a configuration of the carrier of 2.1 GHz is UUUPU".

Figure 8:
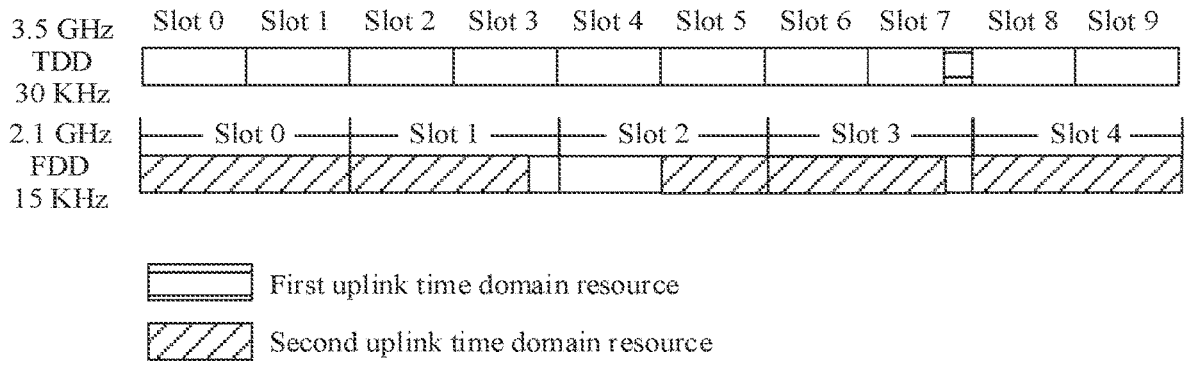
FIG. 8 is another schematic diagram of a time division multiplexing mode according to an embodiment of this application.

FIG. 8 is a schematic diagram of the pattern 2. The access network device reconfigures uplink time domain resources for the carrier of 3.5 GHz and the carrier of 2.1 GHz. The uplink time domain resource (namely, the first uplink time domain resource described in this embodiment of this application) of the carrier of 3.5 GHz is the last two symbols in a slot 7. The uplink time domain resource (namely, the second uplink time domain resource described in this embodiment of this application) of the carrier of 2.1 GHz includes: all symbols in a slot 0, a slot 1, a slot 2, and a slot 4 of the carrier of 2.1 GHz, and the first 12 symbols in a slot 3 of the carrier of 2.1 GHz.

For the pattern 2, one piece of time division mode information sent by the access network device to the terminal may indicate the uplink time domain resource of the carrier of 2.1 GHz and the uplink time domain resource of the carrier of 3.5 GHz. For example, the time division mode information may include a plurality of pieces of indication information, which respectively indicate the last two symbols in the slot 7 of the carrier of 3.5 GHz, the slot 0 of the carrier of 2.1 GHz, the slot 1 of the carrier of 2.1 GHz, the slot 2 of the carrier of 2.1 GHz, the slot 4 of the carrier of 2.1 GHz, and the first 12 symbols in the slot 3 of the carrier of 2.1 GHz. For example, the indication information corresponding to the slot 7 of the carrier of 3.5 GHz may be 7-bit "0000011", and is used to indicate that the last two symbols in the slot 7 of the carrier of 3.5 GHz are used for uplink transmission; the indication information corresponding to the slot 0 of the carrier of 2.1 GHz is 1-bit "1", and is used to indicate that all the symbols in the slot 0 of the carrier of 2.1 GHz are used for uplink transmission; the indication information corresponding to the slot 1 of the carrier of 2.1 GHz is 1-bit "1", and is used to indicate that all the symbols in the slot 1 of the carrier of 2.1 GHz are used for uplink transmission; the indication information corresponding to the slot 2 of the carrier of 2.1 GHz is 1-bit "1", and is used to indicate that all the symbols in the slot 2 of the carrier of 2.1 GHz are used for uplink transmission; the indication information corresponding to the slot 4 of the carrier of 2.1 GHz is 1-bit "1", and is used to indicate that all the symbols in the slot 1 of the carrier of 2.1 GHz are used for uplink transmission; the indication information corresponding to the slot 3 of the carrier of 2.1 GHz is 14-bit "11111111111100", and is used to indicate that the first 12 symbols in the slot 3 of the carrier of 2.1 GHz are used for uplink transmission.

(3) Pattern 3: "A configuration of the carrier of 3.5 GHz is XXXXXXXPUU, and a configuration of the carrier of 2.1 GHz is UUUPX".

Figure 9:
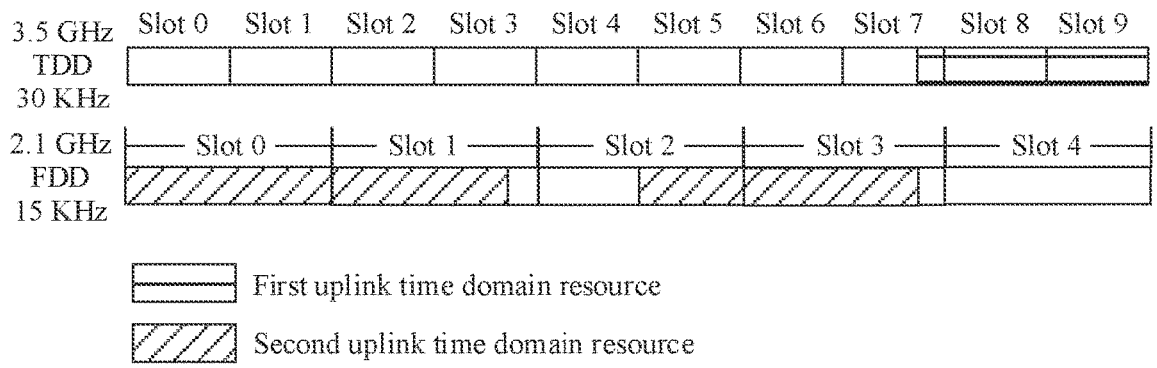
FIG. 9 is another schematic diagram of a time division multiplexing mode according to an embodiment of this application.

FIG. 9 is a schematic diagram of the pattern 3. The access network device reconfigures uplink time domain resources for the carrier of 3.5 GHz and the carrier of 2.1 GHz. The uplink time domain resource (namely, the first uplink time domain resource described in this embodiment of this application) of the carrier of 3.5 GHz is the last two symbols in a slot 7, all symbols in a slot 8, and all symbols in a slot 9. The uplink time domain resource (namely, the second uplink time domain resource described in this embodiment of this application) of the carrier of 2.1 GHz includes: all symbols in a slot 0, a slot 1, and a slot 2 of the carrier of 2.1 GHz, and the first 12 symbols in a slot 3 of the carrier of 2.1 GHz.

For the pattern 2, one piece of time division mode information sent by the access network device to the terminal may indicate the uplink time domain resource of the carrier of 2.1 GHz and the uplink time domain resource of the carrier of 3.5 GHz. For example, the time division mode information may include a plurality of pieces of indication information, which respectively indicate the last two symbols in the slot 7 of the carrier of 3.5 GHz, the slot 8 of the carrier of 3.5 GHz, the slot 9 of the carrier of 3.5 GHz, the slot 0 of the carrier of 2.1 GHz, the slot 1 of the carrier of 2.1 GHz, the slot 2 of the carrier of 2.1 GHz, and the first 12 symbols in the slot 3 of the carrier of 2.1 GHz. For example, the indication information corresponding to the slot 7 of the carrier of 3.5 GHz may be 7-bit "0000011", and is used to indicate that the last two symbols in the slot 7 of the carrier of 3.5 GHz are used for uplink transmission; the indication information corresponding to the slot 8 of the carrier of 3.5 GHz is 1-bit "1", and is used to indicate that all the symbols in the slot 8 of the carrier of 3.5 GHz are used for uplink transmission; the indication information corresponding to the slot 9 of the carrier of 3.5 GHz is 1-bit "1", and is used to indicate that all the symbols in the slot 9 of the carrier of 3.5 GHz are used for uplink transmission; the indication information corresponding to the slot 0 of the carrier of 2.1 GHz is 1-bit "1", and is used to indicate that all the symbols in the slot 0 of the carrier of 2.1 GHz are used for uplink transmission; the indication information corresponding to the slot 1 of the carrier of 2.1 GHz is 1-bit "1", and is used to indicate that all the symbols in the slot 1 of the carrier of 2.1 GHz are used for uplink transmission; the indication information corresponding to the slot 2 of the carrier of 2.1 GHz is 1-bit "1", and is used to indicate that all the symbols in the slot 2 of the carrier of 2.1 GHz are used for uplink transmission; the indication information corresponding to the slot 3 of the carrier of 2.1 GHz is 14-bit "11111111111100", and is used to indicate that the first 12 symbols in the slot 3 of the carrier of 2.1 GHz are used for uplink transmission.

Optionally, the access network device may deliver the slot patterns 1 to 3 of the carrier of 3.5 GHz and the carrier of 2.1 GHz and an index of each pattern to the terminal by using an RRC reconfiguration message. For example, the RRC reconfiguration message carries the time division multiplexing mode information corresponding to the patterns 1 to 3. In addition, the access network device may further indicate one of the patterns 1 to 3 by using a radio access control element (media access control control element, MAC CE) or DCI signaling. For example, the MAC CE or the DCI signaling includes a 2-bit index, and the index is used to indicate one pattern.

After a time division multiplexing mode (namely, a pattern) is configured for the terminal, the terminal always sends data on only one carrier. Therefore, a rate requirement of a 5G communication system can be satisfied, and performance of a single carrier does not deteriorate.

It should be noted that in a scenario in which the carrier of 3.5 GHz is in the TDD mode and the carrier of 2.1 GHz is in the FDD mode, a pattern supporting time division multiplexing of the carrier of 3.5 GHz and the carrier of 2.1 GHz is not limited to the patterns shown in FIG. 7A, FIG. 7B, FIG. 8, and FIG. 9. There may be another possible implementation. This is not limited in this embodiment of this application.

Figure 10:
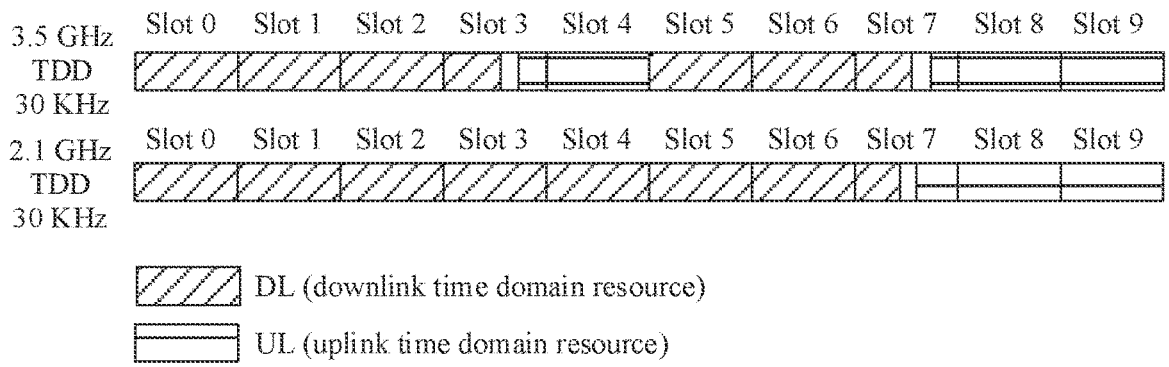
FIG. 10 is a schematic diagram of initially configuring a time domain resource according to an embodiment of this application.

In a possible implementation, the carrier of 3.5 GHz is in the TDD mode, and the carrier of 2.1 GHz is in the TDD mode. The access network device may configure an initially configured time domain resource of the carrier of 3.5 GHz and an initially configured time domain resource of the carrier of 2.1 GHz for the terminal by using an SIB. Refer to FIG. 10, in a single-carrier transmission mode, a frame configuration used for the carrier of 3.5 GHz is DDDSUDDSUU, and a frame configuration used for the carrier of 2.1 GHz is DDDDDDDSUU.

"D" represents an all-downlink slot, "U" represents an all-uplink slot, and "S" represents a flexibly configured slot. One slot of the carrier of 3.5 GHz is 0.5 ms, and one slot includes seven symbols. A subcarrier spacing of the carrier of 2.1 GHz is 30 kHz, one slot is 0.5 ms, and one slot includes seven symbols.

Based on the initially configured time domain resources shown in FIG. 10, time division multiplexing modes (uplink slot patterns) that are determined by a base station and that can be used by the terminal may be the following pattern 1 to pattern 3. Examples are as follows:

(1) Pattern 1: "A configuration of the carrier of 21 GHz is XXXXXXXPUU, and a configuration of the carrier of 3.5 GHz is XXXPUXXXXX".

X is a non-uplink slot, and indicates that all symbols in the slot are not used for the uplink (not scheduled or is used for the downlink). P is a self-contained slot, and indicates that a part of symbols in the slot are used for the uplink, and/or a part of the symbols in the slot are used for the downlink.

For example, the last four symbols in the slot are used for the uplink. U is an all-uplink slot, and indicates that all symbols in the slot are used for the uplink.

Figure 11:
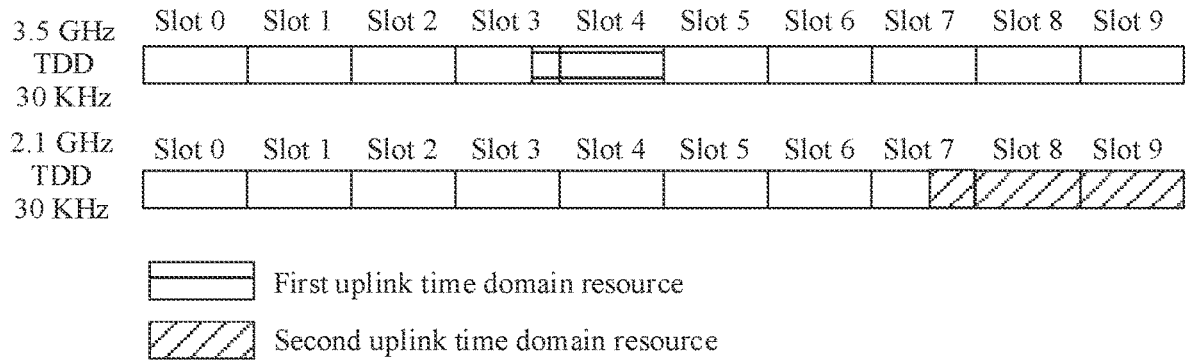
FIG. 11 is another schematic diagram of a time division multiplexing mode according to an embodiment of this application.

FIG. 11 is a schematic diagram of the pattern 1. An uplink time domain resource of the carrier of 2.1 GHz continues to use an uplink resource in the initially configured time domain resource of the carrier of 2.1 GHz shown in FIG. 10, and an uplink time domain resource is reconfigured for the carrier of 3.5 GHz.

Refer to FIG. 11, the access network device reconfigures the uplink time domain resource for the carrier of 3.5 GHz. The uplink time domain resource of the carrier of 3.5 GHz is the last four symbols in a slot 3 and all symbols in a slot 4. The uplink time domain resource of the carrier of 2.1 GHz includes the last four symbols in a slot 7 of the carrier of 2.1 GHz, all symbols in a slot 8 of the carrier of 2.1 GHz, and all symbols in a slot 9 of the carrier of 2.1 GHz.

For the pattern 1, one piece of time division mode information sent by the access network device to the terminal may indicate the uplink time domain resource of the carrier of 3.5 GHz. For example, the time division mode information may include a plurality of pieces of indication information, which respectively indicate the last four symbols in the slot 3 of the carrier of 3.5 GHz, all the symbols in the slot 4 of the carrier of 3.5 GHz, the last four symbols in the slot 7 of the carrier of 2.1 GHz, all the symbols in the slot 8 of the carrier of 2.1 GHz, and all the symbols in the slot 9 of the carrier of 2.1 For example, the indication information corresponding to the slot 3 of the carrier of 3.5 GHz is 7-bit "0001111", and is used to indicate that the last four symbols in the slot 3 of the carrier of 3.5 GHz are used for uplink transmission.

(2) Pattern 2: "A configuration of the carrier of 2.1 GHz is XXXXXXXPXX, and a configuration of the carrier of 3.5 GHz is XXXPUXXXXUU".

Figure 12:
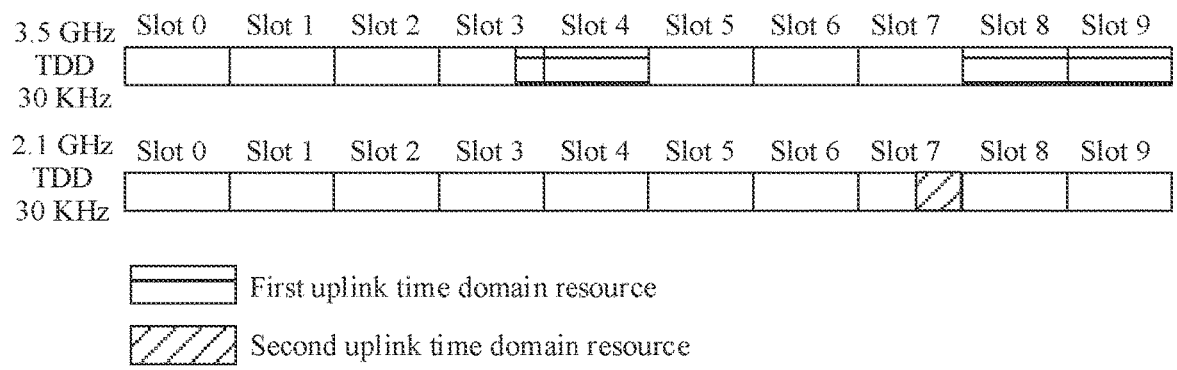
FIG. 12 is another schematic diagram of a time division multiplexing mode according to an embodiment of this application.

FIG. 12 is a schematic diagram of the pattern 1. Uplink time domain resources are reconfigured for the carrier of 2.1 GHz and the carrier of 3.5 GHz.

Refer to FIG. 12, the access network device reconfigures the uplink time domain resource for the carrier of 2.1 GHz. The uplink time domain resource of the carrier of 2.1 GHz is the last four symbols in a slot 7. The uplink time domain resource of the carrier of 3.5 GHz includes the last four symbols in a slot 3 of the carrier of 3.5 GHz, all symbols in a slot 48 of the carrier of 3.5 GHz, all symbols in a slot 8 of the carrier of 3.5 GHz, and all symbols in a slot 9 of the carrier of 3.5 GHz.

For the pattern 2, one piece of time division mode information sent by the access network device to the terminal may indicate the uplink time domain resource of the carrier of 3.5 GHz. For example, the time division mode information may include a plurality of pieces of indication information, which respectively indicate the last four symbols in the slot 7 of the carrier of 2.1 GHz, the last four symbols in the slot 3 of the carrier of 3.5 GHz, all the symbols in the slot 48 of the carrier of 3.5 GHz, all the symbols in the slot 8 of the carrier of 3.5 GHz, and all the symbols in the slot 9 of the carrier of 3.5 GHz. For example, the indication information corresponding to the slot 7 of the carrier of 2.1 GHz is 7-bit "0001111", and is used to indicate that the last four symbols in the slot 7 of the carrier of 2.1 GHz are used for uplink transmission; the indication information corresponding to the slot 3 of the carrier of 3.5 GHz is 7-bit "0001111", and is used to indicate that the last four symbols in the slot 3 of the carrier of 3.5 GHz are used for uplink transmission; the indication information corresponding to the slot 4 of the carrier of 3.5 GHz is 1-bit "1" and is used to indicate that the slot 4 of the carrier of 3.5 GHz is used for uplink transmission; the indication information corresponding to the slot 8 of the carrier of 3.5 GHz is 1-bit "1", and is used to indicate that the slot 8 of the carrier of 3.5 GHz is used for uplink transmission; indication information corresponding to the slot 9 of the carrier of 3.5 GHz is 1-bit "1", and is used to indicate that the slot 9 of the carrier of 3.5 GHz is used for uplink transmission.

It should be noted that in a scenario in which the carrier of 3.5 GHz is in the TDD mode and the carrier of 2.1 GHz is in the TDD mode, a pattern supporting time division multiplexing of the carrier of 3.5 GHz and the carrier of 2.1 GHz is not limited to the pattern 1 and the pattern 2 shown in FIG. 11 and FIG. 12. There may be another possible implementation. This is not limited in this embodiment of this application.

Optionally, the access network device may deliver the slot patterns 1 and 2 of the carrier of 3.5 GHz and the carrier of 2.1 GHz and an index of each pattern to the terminal by using an RRC reconfiguration message. For example, the RRC reconfiguration message carries the time division multiplexing mode information corresponding to the patterns 1 and 2. In addition, the access network device may further indicate either of the patterns 1 and 2 by using a radio access control control element (media access control control element, MAC CE) or DCI signaling. For example, the MAC CE or the DCI signaling includes a 1-bit index, and the index is used to indicate one pattern.

Optionally, the access network device configures the time division multiplexed uplink time domain resources for the plurality of carriers in the time division multiplexing mode by using an SIB message, to be specific, the initially configured resource of the first carrier and the initially configured resource of the second carrier do not overlap.

For example, each of the plurality of pieces of time division multiplexing mode information includes: The first uplink time domain resource is the uplink time domain resource initially configured on the first carrier, and the second uplink time domain resource is the uplink time domain resource initially configured on the second carrier.

For example, configuration information of the first uplink time domain resource may be a parameter used to indicate a frame configuration of the first carrier, for example, X, $X_1$, $Y_1$, $X_2$, and $Y_2$. Configuration information of the second uplink time domain resource may be a parameter used to indicate a frame configuration of the second carrier, for example, X, $X_1$, $Y_1$, $X_2$, and $Y_2$.

Figure 13:
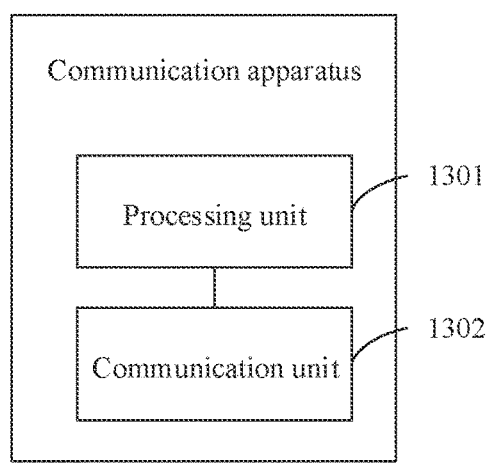
FIG. 13 is a schematic diagram of a structure of a communication apparatus according to an embodiment of this application.

When each functional module is obtained through division based on each corresponding function, FIG. 13 is a schematic diagram of a possible structure of the communication apparatus in the foregoing embodiments. The communication apparatus shown in FIG. 13 may be the terminal described in the embodiments of this application, or may be a component that is in the terminal and that implements the foregoing method, or may be a chip used in the terminal. The chip may be a system-on-a-chip (System-On-a-Chip, SOC), a baseband chip having a communication function, or the like. As shown in FIG. 13, the communication apparatus includes a processing unit 1301 and a communication unit 1302. The processing unit may be one or more processors, and the communication unit may be a transceiver.

The processing unit 1301 is configured to support the terminal in performing internal processing, for example, assembling a data packet, and/or is used in another process of the technology described in this specification.

The communication unit 1302 is configured to support the communication apparatus in communicating with another communication apparatus, for example, support the terminal in performing step 401 and step 402, and/or is used in another process of the technology described in this specification.

It should be noted that all related content of the steps in the foregoing method embodiments may be cited in function descriptions of corresponding functional modules. Details are not described herein again.

Figure 14:
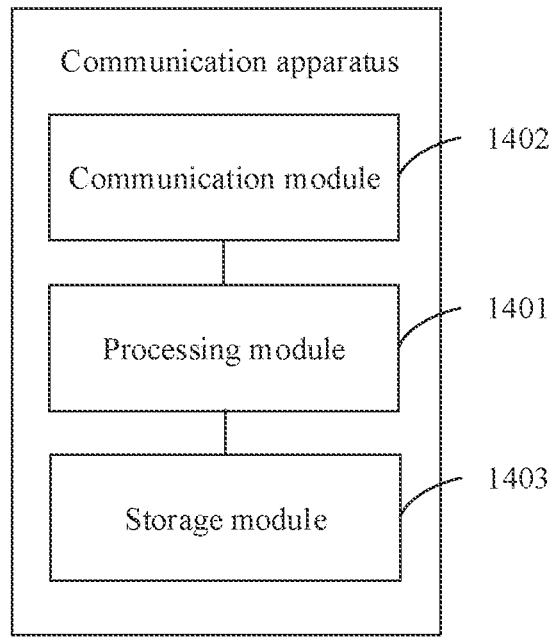
FIG. 14 is another schematic diagram of a structure of a communication apparatus according to an embodiment of this application.

For example, when an integrated unit is used, FIG. 14 is a schematic diagram of a structure of a communication apparatus according to an embodiment of this application. In FIG. 14, the communication apparatus includes a processing module 1401 and a communication module 1402. The processing module 1401 is configured to control and manage actions of the communication apparatus, for example, perform the step performed by the processing unit 1301, and/or is used in another process of the technology described in this specification. The communication module 1402 is configured to perform the step performed by the communication unit 1302, and support the communication apparatus in interacting with another device, for example, another terminal apparatus. As shown in FIG. 14, the communication apparatus may further include a storage module 1403, and the storage module 1403 is configured to store program code and data that are of the communication apparatus.

When the processing module 1401 is a processor, the communication module 1402 is a transceiver, and the storage module 1403 is a memory, the communication apparatus is the communication apparatus shown in FIG. 3A.

Figure 15:
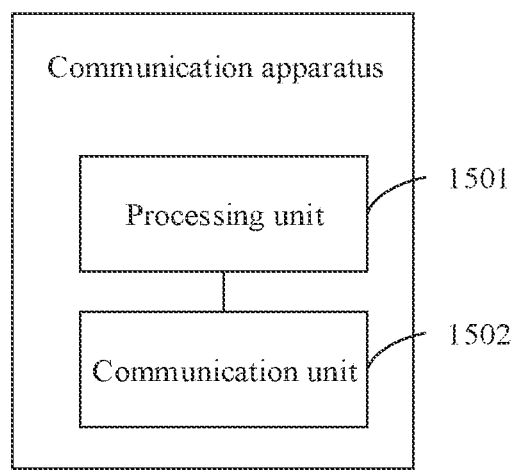
FIG. 15 is another schematic diagram of a structure of a communication apparatus according to an embodiment of this application.

When each functional module is Obtained through division based on each corresponding function, FIG. 15 is a schematic diagram of a possible structure of the communication apparatus in the foregoing embodiments. The communication apparatus shown in FIG. 15 may be the access network device described in the embodiments of this application, or may be a component that is in the access network device and that implements the foregoing method, or may be a chip used in the access network device. The chip may be a system-on-a-chip (System-On-a-Chip, SOC), a baseband chip having a communication function, or the like. As shown in FIG. 15, the communication apparatus includes a processing unit 1501 and a communication unit 1502. The processing unit 1501 may be one or more processors, and the communication unit 1502 may be a transceiver.

The processing unit 1501 is configured to support the access network device in generating "a plurality of pieces of time division multiplexing mode information" and "first information", and/or is used in another process of the technology described in this specification.

The communication unit 1502 is configured to support the communication apparatus in communicating with another communication apparatus, for example, support the access network device in performing step 401 and step 402, and/or is used in another process of the technology described in this specification.

It should be noted that all related content of the steps in the foregoing method embodiments may be cited in function descriptions of corresponding functional modules. Details are not described herein again.

Figure 16:
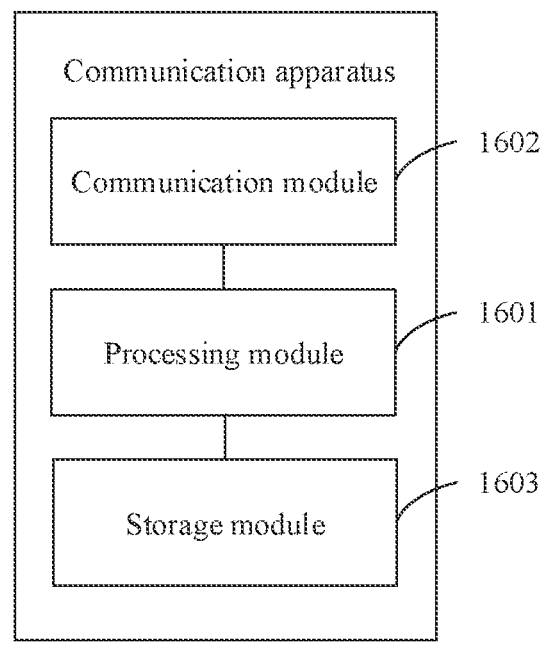
FIG. 16 is another schematic diagram of a structure of a communication apparatus according to an embodiment of this application.

For example, when an integrated unit is used, FIG. 16 is a schematic diagram of a structure of a communication apparatus according to an embodiment of this application. In FIG. 16, the communication apparatus includes a processing module 1601 and a communication module 1602. The processing module 1601 is configured to control and manage actions of the communication apparatus, for example, perform the step performed by the processing unit 1501, and/or is used in another process of the technology described in this specification. The communication module 1602 is configured to perform the step performed by the communication unit 1502, and support the communication apparatus in interacting with another device, for example, another access network device apparatus. As shown in FIG. 16, the communication apparatus may further include a storage module 1603, and the storage module 1603 is configured to store program code and data that are of the communication apparatus.

When the processing module 1601 is a processor, the communication module 1602 is a transceiver, and the storage module 1603 is a memory, the communication apparatus is the communication apparatus shown in FIG. 3B.

An embodiment of this application provides a computer-readable storage medium. The computer-readable storage medium stores instructions. The instructions are used to perform the method shown in FIG. 4.

An embodiment of this application provides a computer program product including instructions. When the computer program product runs on a communication apparatus, the communication apparatus performs the method shown in FIG. 4.

A wireless communication apparatus according to an embodiment of this application includes instructions. When the wireless communication apparatus runs on the communication apparatuses shown in FIG. 3A, FIG. 3B, and FIG. 13 to FIG. 16, the communication apparatus is enabled to perform the method shown in FIG. 4. The wireless communication apparatus may be a chip.

An embodiment of this application further provides a communication system, including a terminal and an access network device. For example, the terminal may be the communication apparatus shown in FIG. 3A, FIG. 13, or FIG. 14, and the access network device may be the communication apparatus shown in FIG. 3B, FIG. 15, or FIG. 16.

The foregoing descriptions about implementations allow a person skilled in the art to clearly understand that, for the purpose of convenient and brief description, division of the foregoing functional modules is used as an example for illustration. In actual applications, the foregoing functions can be allocated to different functional modules and implemented based on a requirement, that is, an inner structure of a database access apparatus is divided into different functional modules to implement all or some of the functions described above.

The processor in the embodiments of this application may include but is not limited to at least one of the following computing devices that run software: a central processing unit (central processing unit, CPU), a microprocessor, a digital signal processor (DSP), a microcontroller unit (microcontroller unit, MCU), an artificial intelligence processor, or the like. Each computing device may include one or more cores configured to perform an operation or processing by executing software instructions. The processor may be an independent semiconductor chip, or may be integrated with another circuit to form a semiconductor chip. For example, the processor and another circuit (for example, an encoding/decoding circuit, a hardware acceleration circuit, or various buses and interface circuits) may form a SoC (system-on-a-chip). Alternatively, the processor may be integrated into an ASIC as a built-in processor of the ASIC, and the ASIC integrated with the processor may be independently packaged or may be packaged with another circuit. In addition to the core configured to perform the operation or processing by executing the software instructions, the processor may further include a necessary hardware accelerator, for example, a field programmable gate array (field programmable gate array, FPGA), a PLD (programmable logic device), or a logic circuit that implements a dedicated logic operation.

The memory in the embodiments of this application may include at least one of the following types: a read-only memory (read-only memory, ROM) or another type of static storage device that can store static information and instructions, a random access memory (random access memory, RAM) or another type of dynamic storage device that can store information and instructions, or may be an electrically erasable programmable read-only memory (Electrically erasable programmable read-only memory, EEPROM). In some scenarios, the memory may alternatively be a compact disc read-only memory (compact disc read-only memory, CD-ROM) or another compact disc storage medium, an optical disc storage medium (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, the memory is not limited thereto.

In this application, "at least one" refers to one or more. "A plurality of" refers to two or more than two. "And/or" describes an association relationship between associated objects, and represents that three relationships may exist. For example, A and/or B may represent the following cases: A exists alone, both A and B exist, and B exists alone, where A and B may be singular or plural. The character "/" usually indicates an "or" relationship between the associated objects. "At least one of the following items (pieces)" or a similar expression thereof means any combination of these items, including any combination of a singular item (piece) or plural items (pieces). For example, at least one of a, b, or c may indicate: a, b, c, a and b, a and c, b and c, or a, b, and c, where a, b and c may be singular or plural. In addition, to clearly describe the technical solutions in the embodiments of this application, in the embodiments of this application, terms such as "first" and "second" are used to distinguish between same objects or similar objects whose functions and purposes are basically the same. A person skilled in the art may understand that the terms such as "first" and "second" do not limit a quantity and an execution sequence, and the terms such as "first" and "second" do not indicate a definite difference.

In the several embodiments provided in this application, it should be understood that the disclosed database access apparatus and method may be implemented in other manners. For example, the described database access apparatus embodiment is merely an example. For example, the module or unit division is merely logical function division and may be other division during actual implementations. For example, a plurality of units or components may be combined or integrated into another apparatus, or some features may be ignored or not performed, in addition, the displayed or discussed mutual couplings or direct couplings or communication connections may be implemented through some interfaces. The indirect couplings or communication connections between the database access apparatuses or units may be implemented in electronic, mechanical, or other forms.

The units described as separate parts may or may not be physically separate, and parts displayed as units may be one or more physical units, may be located in one place, or may be distributed at different places. Some or all of the units may be selected based on an actual requirement to achieve an objective of the solutions of the embodiments.

In addition, the functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication apparatus for an access network device, comprising:
 at least one processor; and
 a non-transitory storage medium coupled to the at least one processor and storing executable instructions that, when executed by the at least one processor, cause the access network device to:
  send a plurality of pieces of time division multiplexing mode information indicating a plurality of time division multiplexing modes to a terminal, wherein each of the plurality of pieces of time division multiplexing mode information indicates one time division multiplexing mode of the plurality of time division multiplexing modes, in the time division multiplexing mode, time division multiplexing is performed on a first uplink time domain resource and a second uplink time domain resource, the first uplink time domain resource is an uplink time domain resource of a first carrier, the second uplink time domain resource is an uplink time domain resource of a second carrier, for each of the first carrier and the second carrier, the plurality of pieces of time division multiplexing mode information include a plurality of pieces of indication information and a plurality of slot identifiers, and the plurality of pieces of indication information correspond one-to-one to the plurality of slot identifiers; and
  in response to sending the plurality of pieces of time division multiplexing mode information, send first information to the terminal, wherein the first information activates one of the plurality of time division multiplexing modes indicated by the plurality of pieces of time division multiplexing mode information.

2. The apparatus according to claim 1, wherein the first uplink time domain resource is an uplink time domain resource initially configured on the first carrier, and the second uplink time domain resource is an uplink time domain resource initially configured on the second carrier.

3. The apparatus according to claim 1, wherein the plurality of pieces of time division multiplexing mode information comprise first time division multiplexing mode information; and
the first time division multiplexing mode information indicates that a part of an uplink time domain resource initially configured on the first carrier is the first uplink time domain resource, and indicates that a part of an uplink time domain resource initially configured on the second carrier is the second uplink time domain resource, and the uplink time domain resource initially configured on the first carrier overlaps the uplink time domain resource initially configured on the second carrier.

4. The apparatus according to claim 1, wherein the plurality of pieces of time division multiplexing mode information are carried by using a radio resource control (RRC) message, and the first information is carried by using downlink control information (DCI).

5. The apparatus according to claim 1, wherein the first information comprises an index of one time division multiplexing mode.

6. The apparatus according to claim 1, wherein:
the first carrier is a primary cell uplink carrier, and the second carrier is a secondary cell uplink carrier.

7. The apparatus according to claim 1, wherein the executable instructions, when executed by the at least one processor, cause the access network device to:
configure the plurality of time division multiplexing modes for the terminal, wherein the plurality of time division multiplexing modes are configured with a plurality of different indexes.

8. The apparatus according to claim 7, wherein in each configured time division multiplexing mode, time domain resources of a plurality of uplink carriers do not overlap.

9. A communication apparatus for a terminal, comprising:
at least one processor; and
a non-transitory storage medium coupled to the at least one processor and storing executable instructions that, when executed by the at least one processor, cause the terminal to:
receive a plurality of pieces of time division multiplexing mode information indicating a plurality of time division multiplexing modes from an access network device, wherein each of the plurality of pieces of time division multiplexing mode information indicates one time division multiplexing mode of the plurality of time division multiplexing modes, in the time division multiplexing mode, time division multiplexing is performed on a first uplink time domain resource and a second uplink time domain resource, the first uplink time domain resource is an uplink time domain resource of a first carrier, the second uplink time domain resource is an uplink time domain resource of a second carrier, for each of the first carrier and the second carrier, the plurality of pieces of time division multiplexing mode information include a plurality of pieces of indication information and a plurality of slot identifiers, and the plurality of pieces of indication information correspond one-to-one to the plurality of slot identifiers; and
in response to receiving the plurality of pieces of time division multiplexing mode information, receive first information from the access network device, wherein the first information indicates one of the plurality of time division multiplexing modes indicated by the plurality of pieces of time division multiplexing mode information.

10. The apparatus according to claim 9, wherein the first uplink time domain resource is an uplink time domain resource initially configured on the first carrier, and the second uplink time domain resource is an uplink time domain resource initially configured on the second carrier.

11. The apparatus according to claim 9, wherein the plurality of pieces of time division multiplexing mode information comprise first time division multiplexing mode information; and
the first time division multiplexing mode information indicates that a part of an uplink time domain resource initially configured on the first carrier is the first uplink time domain resource, and indicates that a part of an uplink time domain resource initially configured on the second carrier is the second uplink time domain resource, and the uplink time domain resource initially configured on the first carrier overlaps the uplink time domain resource initially configured on the second carrier.

12. The apparatus according to claim 9, wherein the plurality of pieces of time division multiplexing mode information are carried by using a radio resource control (RRC) message, and the first information is carried by using downlink control information (DCI).

13. The apparatus according to claim 9, wherein:
the first carrier and the second carrier support carrier aggregation (CA);
the first carrier is a normal uplink (NUL) carrier, and the second carrier is a supplementary uplink (SUL) carrier; or
the first carrier is a primary cell uplink carrier, and the second carrier is a secondary cell uplink carrier.

14. The apparatus according to claim 9, wherein:
the first carrier is a frequency division duplexing (FDD) duplex mode, and the second carrier is a time division duplexing (TDD) duplex mode;
the first carrier is an FDD duplex mode, and the second carrier is an FDD duplex mode;
the first carrier is a TDD duplex mode, and the second carrier is an FDD duplex mode; or
the first carrier is a TDD duplex mode, and the second carrier is a TDD duplex mode.

15. A time division multiplexing mode configuration method, comprising:
receiving, by a terminal, a plurality of pieces of time division multiplexing mode information indicating a plurality of time division multiplexing modes from an access network device, wherein each of the plurality of pieces of time division multiplexing mode information indicates one time division multiplexing mode of the plurality of time division multiplexing modes, in the time division multiplexing mode, time division multiplexing is performed on a first uplink time domain resource and a second uplink time domain resource, the first uplink time domain resource is an uplink time domain resource of a first carrier, the second uplink time domain resource is an uplink time domain resource of a second carrier, for each of the first carrier and the second carrier, the plurality of pieces of time division multiplexing mode information include a plurality of pieces of indication information and a plurality of slot identifiers, and the plurality of pieces of indication information correspond one-to-one to the plurality of slot identifiers; and in response to receiving the plurality of pieces of time division multiplexing mode information, receiving, by the terminal, first information from the access network device, wherein the first information indicates one of the plurality of time division multiplexing modes indicated by the plurality of pieces of time division multiplexing mode information.

16. The method according to claim 15, wherein the first uplink time domain resource is an uplink time domain resource initially configured on the first carrier, and the second uplink time domain resource is an uplink time domain resource initially configured on the second carrier.

17. The method according to claim 15, wherein the plurality of pieces of time division multiplexing mode information comprise first time division multiplexing mode information; and the first time division multiplexing mode information indicates that a part of an uplink time domain resource initially configured on the first carrier is the first uplink time domain resource, and indicates that a part of an uplink time domain resource initially configured on the second carrier is the second uplink time domain resource, and the uplink time domain resource initially configured on the first carrier overlaps the uplink time domain resource initially configured on the second carrier.

18. The method according to claim 15, wherein the plurality of pieces of time division multiplexing mode information are carried by using a radio resource control (RRC) message, and the first information is carried by using downlink control information (DCI).

19. The method according to claim 15, wherein:

the first carrier and the second carrier support carrier aggregation (CA);

the first carrier is a normal uplink (NUL) carrier, and the second carrier is a supplementary uplink (SUL) carrier; or the first carrier is a primary cell uplink carrier, and the second carrier is a secondary cell uplink carrier.

20. The method according to claim 15, wherein:

the first carrier is a frequency division duplexing (FDD) duplex mode, and the second carrier is a time division duplexing (TDD) duplex mode;

the first carrier is an FDD duplex mode, and the second carrier is an FDD duplex mode;

the first carrier is a TDD duplex mode, and the second carrier is an FDD duplex mode; or the first carrier is a TDD duplex mode, and the second carrier is a TDD duplex mode.

* * * * *